(12) United States Patent
Kim et al.

(10) Patent No.: US 12,444,458 B2
(45) Date of Patent: Oct. 14, 2025

(54) MEMORY CELL ARRAY OF A STATIC RANDOM ACCESS MEMORY AND A STATIC RANDOM ACCESS MEMORY INCLUDING THE SAME

(71) Applicant: SAMSUNG ELECTRONICS CO., LTD., Suwon-si (KR)

(72) Inventors: Hyunjun Kim, Suwon-si (KR); Sekeon Kim, Seoul (KR); Seongook Jung, Seoul (KR); Kyeongrim Baek, Seoul (KR); Keonhee Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/227,355

(22) Filed: Jul. 28, 2023

(65) Prior Publication Data

US 2024/0233812 A1 Jul. 11, 2024

(30) Foreign Application Priority Data

Jan. 10, 2023 (KR) .................. 10-2023-0003326

(51) Int. Cl.
*G11C 11/4096* (2006.01)
*G11C 5/06* (2006.01)
*G11C 11/4074* (2006.01)

(52) U.S. Cl.
CPC .......... *G11C 11/4096* (2013.01); *G11C 5/063* (2013.01); *G11C 11/4074* (2013.01)

(58) Field of Classification Search
CPC . G11C 11/4096; G11C 5/063; G11C 11/4074; G11C 11/412; G11C 11/419; G11C 7/18; G11C 8/10; H10B 10/12

USPC ..................... 365/189.011, 230.06
See application file for complete search history.

(56) References Cited

U.S. PATENT DOCUMENTS

| | | | |
|---|---|---|---|
| 7,333,357 B2 | 2/2008 | Houston | |
| 7,420,857 B2 | 9/2008 | Hirota et al. | |
| 7,447,058 B2 | 11/2008 | Maki et al. | |
| 7,746,722 B2 * | 6/2010 | Brown ................ | G11C 8/10 365/233.5 |
| 7,869,263 B2 | 1/2011 | Lih et al. | |
| 8,406,039 B2 | 3/2013 | Lee et al. | |

(Continued)

FOREIGN PATENT DOCUMENTS

KR 10-1702385 1/2017

*Primary Examiner* — Michael T Tran
(74) *Attorney, Agent, or Firm* — MORGAN, LEWIS & BOCKIUS LLP

(57) ABSTRACT

A memory cell array of an SRAM including: a top memory cell array including top memory cells; and a bottom memory cell array including bottom memory cells, the top memory cells include: a first top memory cell between a power supply voltage and a middle node, and connected to a first top wordline, a first top bitline and a first top complementary bitline, the bottom memory cells include: a first bottom memory cell to operate with the first top memory cell, connected between the middle node and a ground voltage, and connected to a first bottom wordline, a first bottom bitline and a first bottom complementary bitline, and when write and read operations are not performed on the first top and bottom memory cells, the first top bitline, the first top complementary bitline, the first bottom bitline and the first bottom complementary bitline are connected to the middle node.

20 Claims, 22 Drawing Sheets

(56) References Cited

U.S. PATENT DOCUMENTS

| | | |
|---|---|---|
| 8,670,265 B2 | 3/2014 | Deng |
| 9,165,641 B2 | 10/2015 | Gulati et al. |
| 9,767,892 B1 | 9/2017 | Kumar et al. |
| 10,242,733 B2 | 3/2019 | Nii et al. |
| 10,332,588 B2 | 6/2019 | Huynh Bao et al. |
| 2002/0141259 A1* | 10/2002 | Mak ............... G11C 29/02 365/201 |
| 2003/0179635 A1* | 9/2003 | Terzioglu ........ G11C 29/50 365/201 |
| 2005/0254284 A1* | 11/2005 | Kang ............. G11C 13/003 365/151 |
| 2007/0072360 A1* | 3/2007 | Kumar ............ G11C 17/14 365/163 |
| 2009/0109789 A1* | 4/2009 | Terzioglu ........ G11C 7/227 365/230.06 |
| 2011/0149667 A1* | 6/2011 | Hamzaoglu ...... G11C 11/413 365/205 |
| 2011/0199817 A1* | 8/2011 | Joshi ............. G11C 11/413 365/225.7 |
| 2015/0380076 A1 | 12/2015 | Maeda et al. |
| 2018/0040366 A1* | 2/2018 | Sinangil ......... G11C 11/419 |
| 2019/0043553 A1* | 2/2019 | Chang ............ G11C 11/4097 |
| 2023/0067765 A1* | 3/2023 | Sharma .......... H01L 24/80 |
| 2023/0089791 A1* | 3/2023 | Cheng ........... H10N 70/841 257/4 |

\* cited by examiner

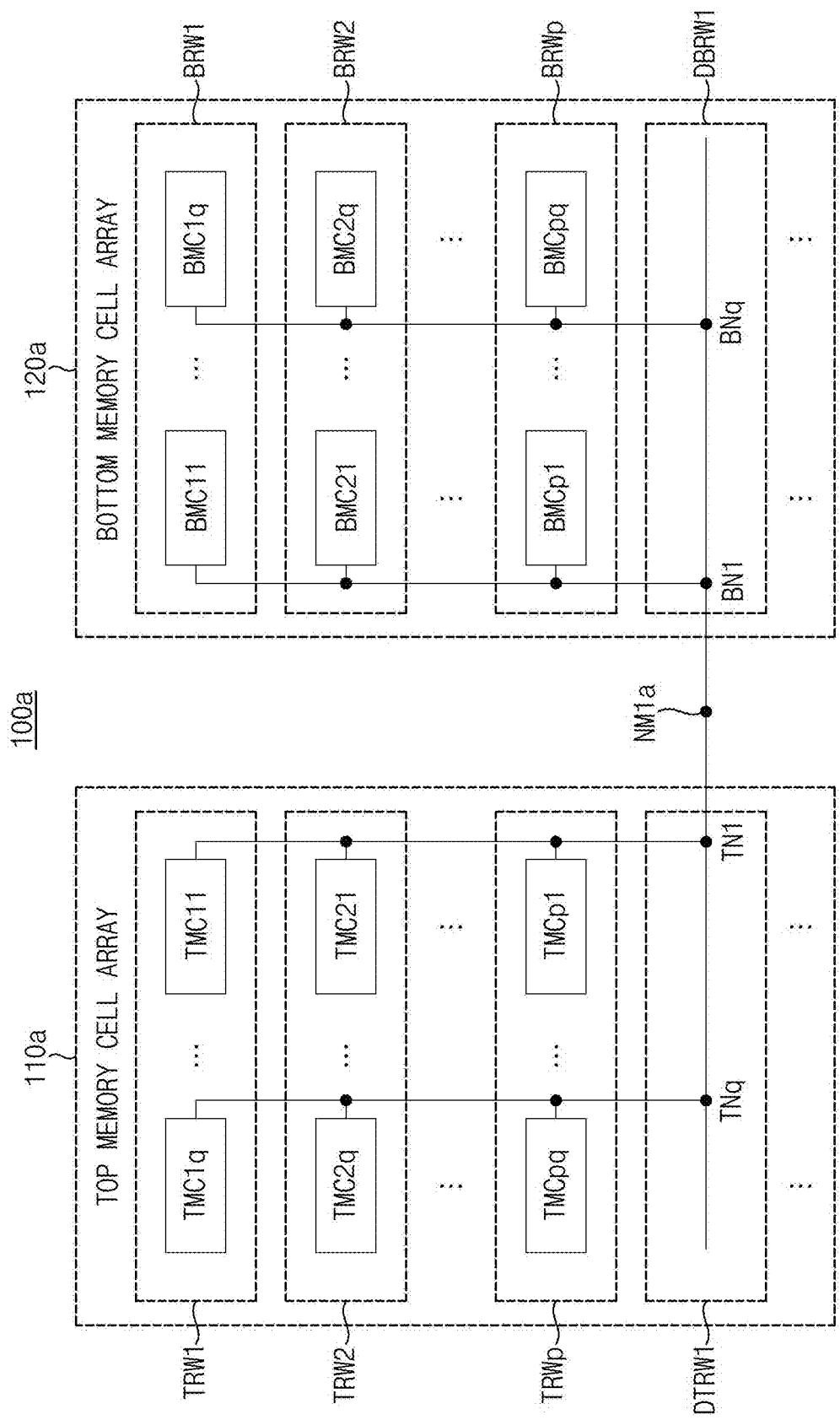

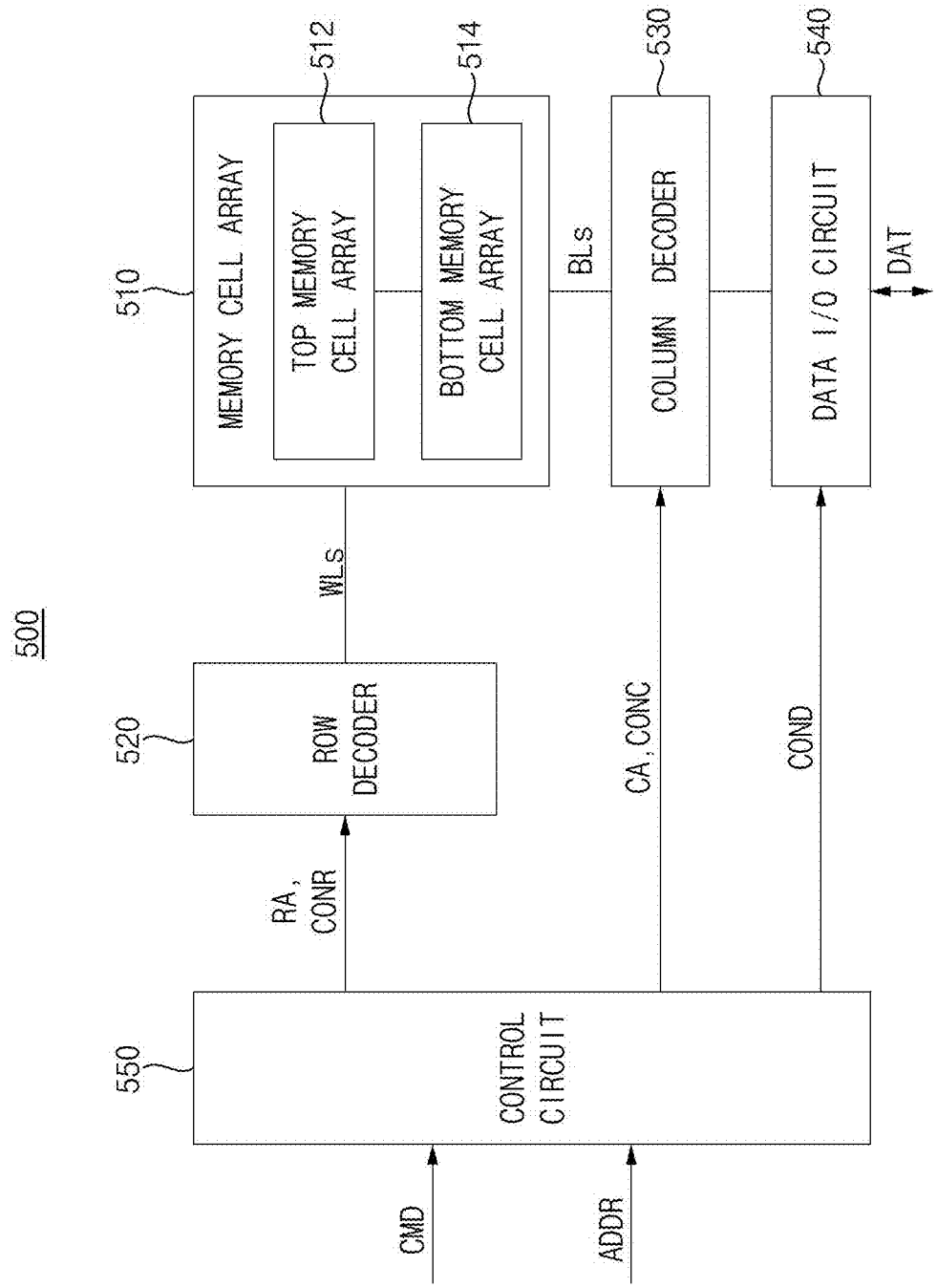

FIG. 12B
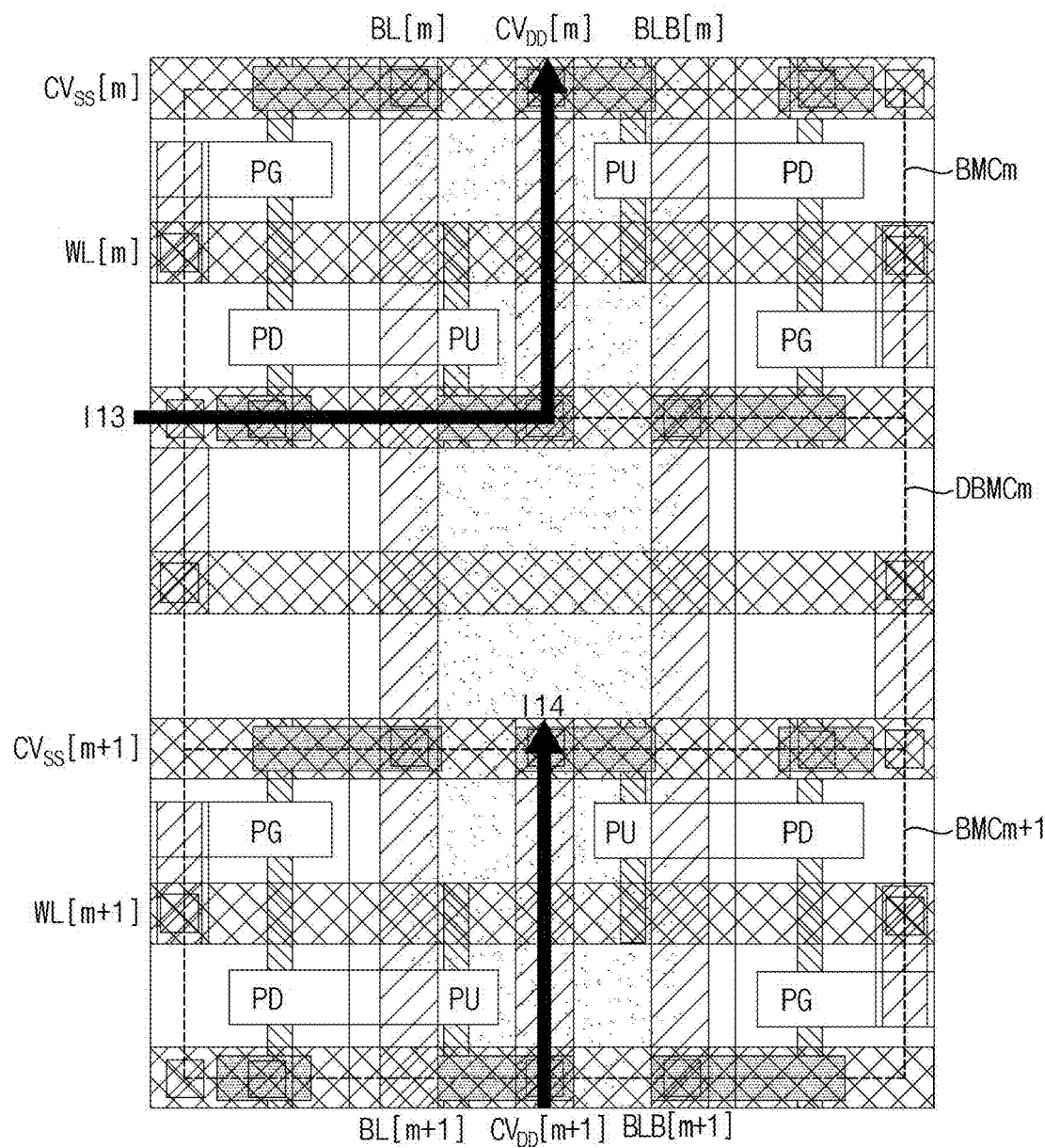
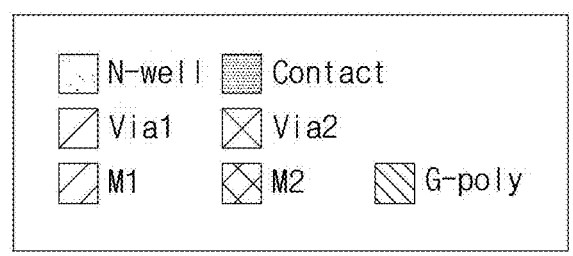

MEMORY CELL ARRAY OF A STATIC RANDOM ACCESS MEMORY AND A STATIC RANDOM ACCESS MEMORY INCLUDING THE SAME

CROSS-REFERENCE TO RELATED APPLICATION

This application claims priority under 35 U.S.C. § 119 to Korean Patent Application No. 10-2023-0003326 filed on Jan. 10, 2023 in the Korean Intellectual Property Office (KIPO), the disclosure of which is incorporated by reference herein in its entirety.

1. TECHNICAL FIELD

Example embodiments of the present disclosure relate generally to semiconductor integrated circuits, and more particularly to memory cell arrays of static random access memories, and static random access memories including the memory cell arrays.

2. DESCRIPTION OF THE RELATED ART

As miniaturization technology advances, transistors are made smaller, necessitating voltage scaling to ensure reliability and manage power consumption. However, this miniaturization process amplifies the impact of variations in manufacturing parameters. Consequently, the threshold voltages of transistors in memory cells become increasingly variable, reducing the operation margin of the memory. This makes it challenging to perform stable reading and writing with a low power supply voltage.

Various configurations have been proposed to ensure stable data writing and reading in a static random access memory (SRAM) even at low power supply voltages. For example, as the demand for devices requiring fast data processing and extended battery life grows, research into SRAMs with high-speed operation and low leakage current has occurred.

SUMMARY

At least one example embodiment of the present disclosure provides a memory cell array of a static random access memory (SRAM), wherein the memory cell array is capable of high-speed operation with reduced leakage current and reduced area.

At least one example embodiment of the present disclosure provides an SRAM including the memory cell array.

According to example embodiments of the present disclosure, there is provided a memory cell array of an SRAM including: a top memory cell array including a plurality of top memory cells; and a bottom memory cell array including a plurality of bottom memory cells, wherein the plurality of top memory cells include: a first top memory cell connected between a power supply voltage and a middle node, and connected to a first top wordline, a first top bitline and a first top complementary bitline, wherein the plurality of bottom memory cells include: a first bottom memory cell configured to operate with the first top memory cell, connected between the middle node and a ground voltage, and connected to a first bottom wordline, a first bottom bitline and a first bottom complementary bitline, and when a write operation and a read operation are not performed on the first top memory cell and the first bottom memory cell, the first top bitline, the first top complementary bitline, the first bottom bitline and the first bottom complementary bitline are electrically connected to the middle node.

According to example embodiments of the present disclosure, there is provided an SRAM including: a memory cell array including a top memory cell array and a bottom memory cell array, the top memory cell array including a plurality of top memory cells, the bottom memory cell array including a plurality of bottom memory cells; a row decoder connected to the memory cell array through a plurality of wordlines; and a column decoder connected to the memory cell array through a plurality of bitlines, wherein the plurality of top memory cells include: a first top memory cell connected between a power supply voltage and a middle node, and connected to a first top wordline, a first top bitline and a first top complementary bitline, wherein the plurality of bottom memory cells include: a first bottom memory cell configured to operate with the first top memory cell, connected between the middle node and a ground voltage, and connected to a first bottom wordline, a first bottom bitline and a first bottom complementary bitline, and when a write operation and a read operation are not performed on the first top memory cell and the first bottom memory cell, the first top bitline, the first top complementary bitline, the first bottom bitline and the first bottom complementary bitline are electrically connected to the middle node.

According to example embodiments of the present disclosure, there is provided a memory cell array of an SRAM including: a top memory cell array including a plurality of top memory cells; and a bottom memory cell array including a plurality of bottom memory cells, wherein the plurality of top memory cells include: a first top memory cell connected between a power supply voltage and a middle node, and connected to a first top wordline, a first top bitline and a first top complementary bitline, the first top memory cell having a 6T structure with six transistors, the six transistors of the first top memory cell including two p-type metal oxide semiconductor (PMOS) pass gate transistors, wherein the plurality of bottom memory cells include: a first bottom memory cell configured to operate with the first top memory cell, connected between the middle node and a ground voltage, and connected to a first bottom wordline, a first bottom bitline and a first bottom complementary bitline, the first bottom memory cell having a 6T structure with six transistors, the six transistors of the first bottom memory cell including two n-type metal oxide semiconductor (NMOS) pass gate transistors, when a write operation and a read operation are not performed on the first top memory cell and the first bottom memory cell, the first top bitline, the first top complementary bitline, the first bottom bitline and the first bottom complementary bitline are electrically connected to the middle node, when the write operation or the read operation is performed on the first top memory cell and the first bottom memory cell, the write operation or the read operation is performed on the first top memory cell and the first bottom memory cell, in a first time interval of the write operation or the read operation before the first top wordline and the first bottom wordline are enabled, a first top ground voltage of the first top memory cell decreases, and a first bottom power supply voltage of the first bottom memory cell increases, and in a second time interval of the write operation or the read operation after the first time interval, a voltage at the first top wordline corresponds to a logic low level, and a voltage at the first bottom wordline corresponds to a logic high level.

The memory cell array and the SRAM according to example embodiments of the present disclosure may be implemented with the fully-symmetric voltage-stacked (FSVS) structure. For example, the top memory cells and the bottom memory cells may be implemented with the voltage-stacked structure, and thus the leakage current may be reduced. In addition, a pair of top/bottom memory cells may be simultaneously accessed, the fully-symmetric operation may be performed on a pair of top/bottom memory cells, and thus the memory cell array and the SRAM may have relatively high operating speed. Further, all of the top memory cells and the bottom memory cells may be implemented to have the 6T structure, and thus the memory cell array and the SRAM may be industrially compatible, may have high process versatility and may have reduced area.

BRIEF DESCRIPTION OF THE DRAWINGS

Illustrative, non-limiting example embodiments of the present disclosure will be more clearly understood from the following detailed description taken in conjunction with the accompanying drawings.

FIG. 7 is a block diagram illustrating a memory cell array of an SRAM according to example embodiments.

FIG. 8 is a block diagram illustrating an SRAM according to example embodiments.

FIGS. 12A and 12B are plan views of an example layout of a memory cell array of FIG. 11.

DETAILED DESCRIPTION OF THE EMBODIMENTS

Figure 1:
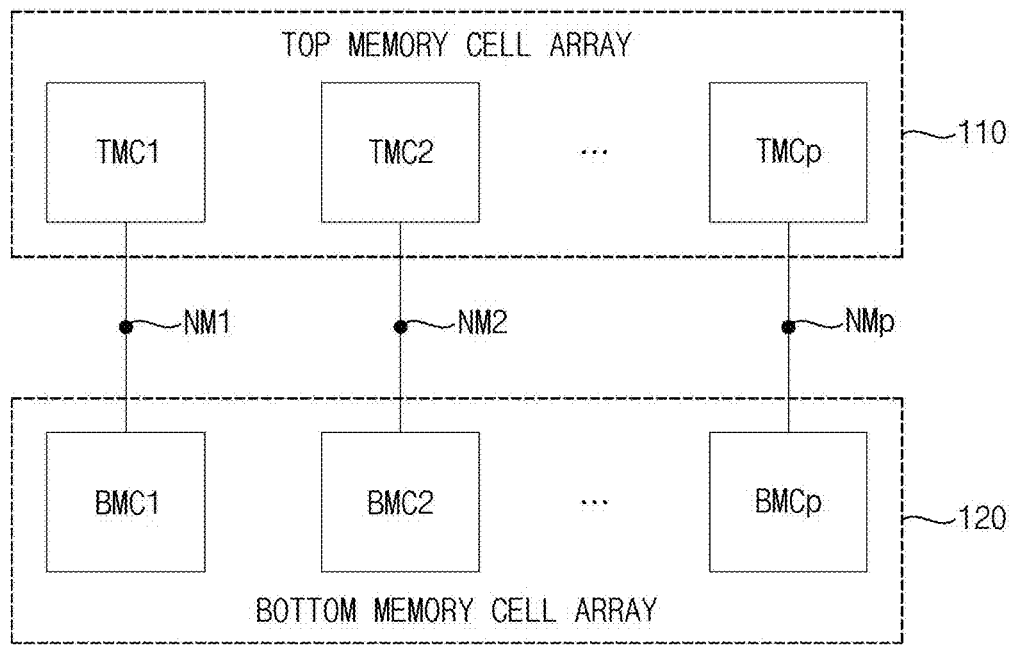
FIG. 1 is a block diagram illustrating a memory cell array of a static random access memory (SRAM) according to example embodiments.

Various example embodiments of the present disclosure will be described more fully with reference to the accompanying drawings. The present disclosure may, however, be embodied in many different forms and should not be construed as limited to the embodiments set forth herein. Like reference numerals may refer to like elements throughout this application.

FIG. 1 is a block diagram illustrating a memory cell array of a static random access memory (SRAM) according to example embodiments.

Referring to FIG. 1, a memory cell array 100 of an SRAM includes a top (or upper) memory cell array 110 and a bottom (or lower) memory cell array 120.

The top memory cell array 110 includes a plurality of top (or upper) memory cells TMC1, TMC2, . . . , TMCp, where p is a natural number (or positive integer) greater than or equal to two. The top memory cell array 110 may be a part of the memory cell array 100, and may be a sub-memory cell array or sub-array. The top memory cell array 110 may be referred to as a top array, a first sub-memory cell array, a first sub-array, or the like.

The bottom memory cell array 120 includes a plurality of bottom (or lower) memory cells BMC1, BMC2, . . . , BMCp. Like the top memory cell array 110, the bottom memory cell array 120 may be a part of the memory cell array 100, and may be a sub-memory cell array or a sub-array. The bottom memory cell array 120 may be referred to as a bottom array, a second sub-memory cell array, a second sub-array, or the like.

One of the plurality of top memory cells TMC1 to TMCp and one of the plurality of bottom memory cells BMC1 to BMCp may operate as a pair. In addition, one of the plurality of top memory cells TMC1 to TMCp and one of the plurality of bottom memory cells BMC1 to BMCp may be connected to each other through one of a plurality of middle (or intermediate) nodes NM1, NM2, . . . , NMp.

For example, a first top memory cell TMC1 may be connected to a first bottom memory cell BMC1 through a first middle node NM1, and the first top memory cell TMC1 and the first bottom memory cell BMC1 may operate as a pair. A second top memory cell TMC2 may be connected to a second bottom memory cell BMC2 through a second middle node NM2, and the second top memory cell TMC2 and the second bottom memory cell BMC2 may operate as a pair. A p-th top memory cell TMCp may be connected to a p-th bottom memory cell BMCp through a p-th middle node NMp, and the p-th top memory cell TMCp and the p-th bottom memory cell BMCp may operate as a pair. Thus, the number of the plurality of top memory cells TMC1 to TMCp and the number of the plurality of bottom memory cells BMC1 to BMCp may be substantially equal to each other.

In some example embodiments, as will be described with reference to FIG. 2, one of the plurality of top memory cells TMC1 to TMCp and one of the plurality of bottom memory cells BMC1 to BMCp may be implemented with a voltage-stacked structure in which one of the plurality of top memory cells TMC1 to TMCp and one of the plurality of bottom memory cells BMC1 to BMCp are connected in series between a power supply voltage and a ground voltage. In this example, a middle voltage between the power supply voltage and the ground voltage may be formed at each of the plurality of middle nodes NM1 to NMp, and thus a leakage current may be reduced.

In some example embodiments, as will be described with reference to FIG. 3, each of the plurality of top memory cells TMC1 to TMCp and each of the plurality of bottom memory cells BMC1 to BMCp may have a 6T structure including six transistors. Each memory cell in a general SRAM may have the 6T structure, and thus the memory cell array 100 according to example embodiments may be implemented with an industry-compatible structure.

In some example embodiments, as will be described with reference to FIGS. 3, 5A and 5B, a structure of each of the plurality of top memory cells TMC1 to TMCp and a structure of each of the plurality of bottom memory cells BMC1 to BMCp may be very similar to each other, but they are not completely identical to each other. For example, some elements in each of the plurality of top memory cells TMC1 to TMCp and some elements in each of the plurality of bottom memory cells BMC1 to BMCp may be different from each other. For example, a configuration of pass gate transistors in each of the plurality of top memory cells TMC1 to TMCp and a configuration of pass gate transistors in each of the plurality of bottom memory cells BMC1 to BMCp may be different from each other. For example, a pass gate transistor in the first top memory cell TMC1 may be different than a pass gate transistor in the first bottom memory cell BMC1.

In some example embodiments, as will be described with reference to FIGS. 6A and 6B, a write operation or a read operation may be performed substantially simultaneously (or concurrently) and fully-symmetrically on one of the plurality of top memory cells TMC1 to TMCp and one of the plurality of bottom memory cells BMC1 to BMCp which operate as a pair. Thus, a pair of top and bottom memory cells may be accessed at one time, and the memory cell array 100 and the SRAM including the memory cell array 100 may have relatively high operating speed.

As described above, the memory cell array 100 of the SRAM according to example embodiments may be implemented with the voltage-stacked structure, and may perform the fully-symmetric operation. Therefore, the memory cell array 100 of the SRAM according to example embodiments may be referred to as a fully-symmetric voltage-stacked (FSVS) structure.

In some example embodiments, as will be described with reference to FIGS. 6A and 6B, while the write operation or the read operation is performed on one of the plurality of top memory cells TMC1 to TMCp and one of the plurality of bottom memory cells BMC1 to BMCp which operate as a pair, the minimum operating voltage may be reduced by the assist effect.

In some example embodiments, as will be described with reference to FIG. 7, the plurality of top memory cells TMC1 to TMCp and the plurality of bottom memory cells BMC1 to BMCp may be arranged in a two-dimensional (2D) matrix formation, and a configuration for an electrical connection with one middle node may be shared by two or more top memory cells and/or two or more bottom memory cells. For example, the first and second top memory cells TMC1 and TMC2 may share the same middle node with the first and second bottom memory cells BMC1 and BMC2.

As described above, the memory cell array 100 of the SRAM according to example embodiments may be implemented with the FSVS structure. For example, the top memory cells TMC1 to TMCp and the bottom memory cells BMC1 to BMCp may be implemented with the voltage-stacked structure, and thus the leakage current may be reduced. In addition, a pair of top/bottom memory cells (e.g., the memory cells TMC1 and BMC1) may be simultaneously accessed, the fully-symmetric operation may be performed on a pair of top/bottom memory cells, and thus the memory cell array 100 and the SRAM may have relatively high operating speed. Further, all of the top memory cells TMC1 to TMCp and the bottom memory cells BMC1 to BMCp may be implemented to have the 6T structure, and thus the memory cell array 100 and the SRAM may be industrially compatible, may have high process versatility and may have reduced area.

Figure 2:
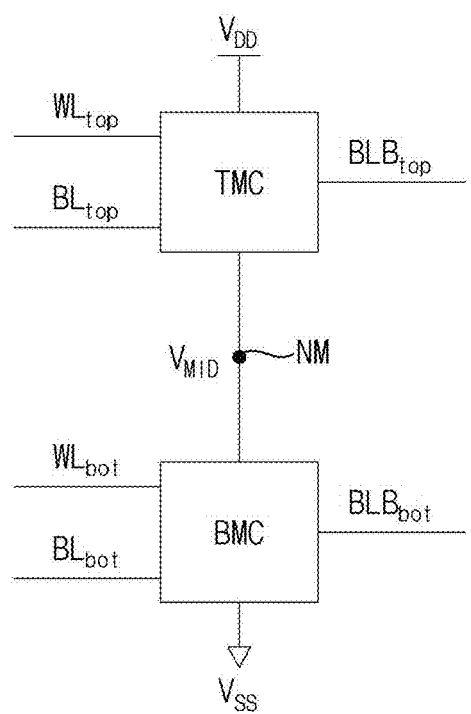
FIG. 2 is a block diagram illustrating an example of a pair of a top memory cell and a bottom memory cell included in a memory cell array of FIG. 1.

FIG. 2 is a block diagram illustrating an example of a pair of a top memory cell and a bottom memory cell included in a memory cell array of FIG. 1.

Referring to FIG. 2, a top memory cell TMC may be connected between a power supply voltage $V_{DD}$ and a middle node NM, and may be connected to a top wordline $WL_{top}$, a top bitline $BL_{top}$ and a top complementary (or inverted) bitline $BLB_{top}$. A bottom memory cell BMC operating as a pair with the top memory cell TMC may be connected between the middle node NM and a ground voltage $V_{SS}$, and may be connected to a bottom wordline $WL_M$, a bottom bitline $BL_{bot}$ and a bottom complementary (or inverted) bitline $BLB_{bot}$. For example, a middle voltage $V_{MID}$ may be formed at the middle node NM, e.g., $V_{MID}=0.5*V_{DD}$.

The top memory cell TMC may be one of the plurality of top memory cells TMC1 to TMCp in FIG. 1. The bottom memory cell BMC may be one of the plurality of bottom memory cells BMC1 to BMCp in FIG. 1. The middle node NM may be one of the plurality of middle nodes NM1 to NMp in FIG. 1.

For example, when the top memory cell TMC, the middle node NM and the bottom memory cell BMC are the first top memory cell TMC1, the first middle node NM1 and the first bottom memory cell BMC1 in FIG. 1, respectively, the top wordline $WL_{top}$, the top bitline $BL_{top}$ and the top complementary bitline $BLB_{top}$ may be a first top wordline, a first top bitline and a first top complementary bitline, respectively, and the bottom wordline $WL_{bot}$, the bottom bitline $BL_{bot}$ and the bottom complementary bitline $BLB_{bot}$ may be a first bottom wordline, a first bottom bitline and a first bottom complementary bitline, respectively. When the top memory cell TMC, the middle node NM and the bottom memory cell BMC are the second top memory cell TMC2, the second middle node NM2 and the second bottom memory cell BMC2 in FIG. 1, respectively, the top wordline $WL_{top}$, the top bitline $BL_{bot}$ and the top complementary bitline $BLB_{top}$ may be a second top wordline, a second top bitline and a second top complementary bitline, respectively, and the bottom wordline $WL_{bot}$, the bottom bitline $BL_{bot}$ and the bottom complementary bitline $BLB_{bot}$ may be a second bottom wordline, a second bottom bitline and a second bottom complementary bitline, respectively. When the top memory cell TMC, the middle node NM and the bottom memory cell BMC are the p-th top memory cell TMCp, the p-th middle node NMp and the p-th bottom memory cell BMCp in FIG. 1, respectively, the top wordline $WL_{top}$, the top bitline $BL_{top}$ and the top complementary bitline $BLB_{top}$ may be a p-th top wordline, a p-th top bitline and a p-th top complementary bitline, respectively, and the bottom wordline $WL_{bot}$, the bottom bitline $BL_{bot}$ and the bottom complementary bitline $BLB_{bot}$ may be a p-th bottom wordline, a p-th bottom bitline and a p-th bottom complementary bitline, respectively.

The voltage-stacked structure may be a circuit implementation technique in which circuits are stacked in series to form a middle voltage, thereby reducing power consumption of a low dropout regulator (LDO) using a conventional voltage drop scheme. In other words, the voltage-stacked structure is a circuit design where circuits are arranged in series to create an intermediate voltage. This structure can help reduce the power consumption of an LDO, which uses a less efficient voltage drop scheme. Since the SRAM has a symmetrical structure, the middle voltage may be maintained at a half of the power supply voltage when the voltage-stacked structure is applied to the SRAM, and thus the SRAM may be suitable for having the voltage-stacked structure. In the memory cell array 100 implemented with the FSVS structure according to example embodiments, each top memory cell TMC included in the top memory cell array 110 and each bottom memory cell BMC included in the bottom memory cell array 120 may be stacked in series from the power supply voltage $V_{DD}$ to the ground voltage $V_{SS}$. Accordingly, $V_{MID}=0.5*V_{DD}$ may be formed stably, and the leakage current may be reduced.

Figure 3:
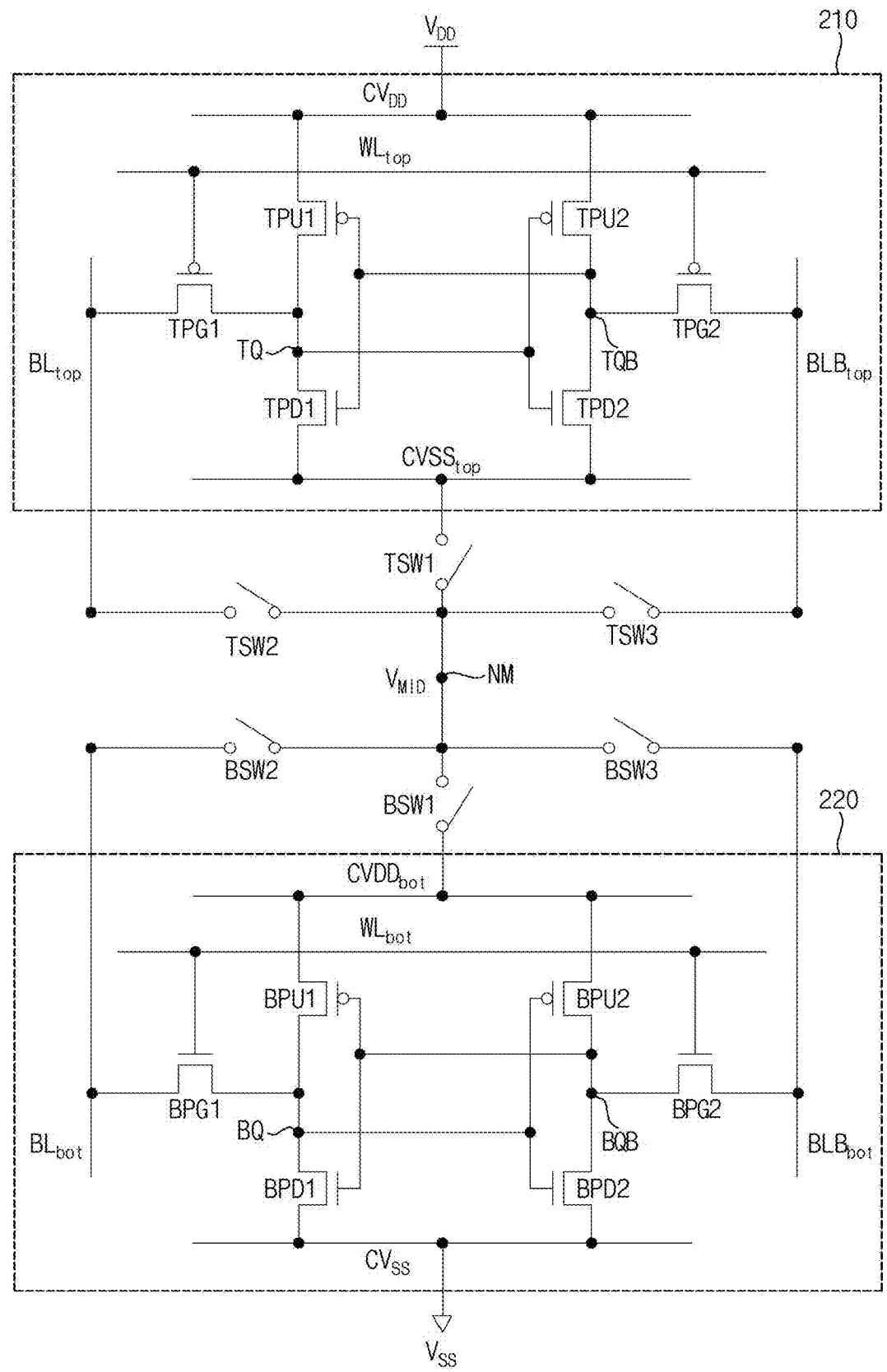
FIG. 3 is a circuit diagram illustrating an example of a top memory cell and a bottom memory cell in FIG. 2.

FIG. 3 is a circuit diagram illustrating an example of a top memory cell and a bottom memory cell in FIG. 2.

Referring to FIG. 3, a top memory cell 210 may be connected between the power supply voltage $V_{DD}$ and the middle node NM, and may be connected to the top wordline $WL_{top}$, the top bitline $BL_{top}$ and the top complementary bitline $BLB_{top}$. The top memory cell 210 may include top p-type metal oxide semiconductor (PMOS) transistors TPU1, TPU2, TPG1 and TPG2, and top n-type metal oxide semiconductor (NMOS) transistors TPD1 and TPD2.

The top PMOS transistor TPU1 and the top NMOS transistor TPD1 may be connected in series between a top power supply voltage $CV_{DD}$ and a top ground voltage $CVSS_{top}$, and each of the top PMOS transistor TPU1 and the top NMOS transistor TPD1 may include a gate electrode connected to a node TQB. The top PMOS transistor TPU2 and the top NMOS transistor TPD2 may be connected in series between the top power supply voltage $CV_{DD}$ and the top ground voltage $CVSS_{top}$, and each of the top PMOS transistor TPU2 and the top NMOS transistor TPD2 may include a gate electrode connected to a node TQ. The top power supply voltage $CV_{DD}$ may be substantially equal to the power supply voltage $V_{DD}$, and the top ground voltage $CVSS_{top}$ may be substantially equal to or different from a voltage at the middle node NM, e.g., the middle voltage $V_{MID}$, depending on an operating state of the top memory cell 210. The top PMOS transistor TPG1 may be connected between the node TQ and the top bitline $BL_{top}$, and may include a gate electrode connected to the top wordline $WL_{top}$. The top PMOS transistor TPG2 may be connected between the node TQB and the top complementary bitline $BLB_{top}$, and may include a gate electrode connected to the top wordline $WL_{top}$.

A bottom memory cell 220 may be connected between the middle node NM and the ground voltage $V_{SS}$, and may be connected to the bottom wordline $WL_{bot}$, the bottom bitline $BL_{bot}$ and the bottom complementary bitline $BLB_{bot}$. The bottom memory cell 220 may include bottom PMOS transistors BPU1 and BPU2, and bottom NMOS transistors BPD1, BPD2, BPG1 and BPG2.

The bottom PMOS transistor BPU1 and the bottom NMOS transistor BPD1 may be connected in series between a bottom power supply voltage $CVDD_{bot}$ and a bottom ground voltage $CV_{SS}$, and each of the bottom PMOS transistor BPU1 and the bottom NMOS transistor BPD1 may include a gate electrode connected to a node BQB. The bottom PMOS transistor BPU2 and the bottom NMOS transistor BPD2 may be connected in series between the bottom power supply voltage $CVDD_{bot}$ and the bottom ground voltage $CV_{SS}$, and each of the bottom PMOS transistor BPU2 and the bottom NMOS transistor BPD2 may include a gate electrode connected to a node BQ. The bottom power supply voltage $CVDD_{bot}$ may be substantially equal to or different from the voltage at the middle node NM, e.g., the middle voltage $V_{MID}$, depending on an operating state of the bottom memory cell 220, and the bottom ground voltage $CV_{SS}$ may be substantially equal to the ground voltage $V_{SS}$. The bottom NMOS transistor BPG1 may be connected between the node BQ and the bottom bitline $BL_{bot}$, and may include a gate electrode connected to the bottom wordline $WL_{bot}$. The bottom NMOS transistor BPG2 may be connected between the node BQB and the bottom complementary bitline $BLB_{bot}$, and may include a gate electrode connected to the bottom wordline $WL_{bot}$.

Among the transistors included in the top memory cell 210 and the bottom memory cell 220, the top PMOS transistors TPU1 and TPU2 and the bottom PMOS transistors BPU1 and BPU2 may be referred to as pull-up transistors, the top NMOS transistors TPD1 and TPD2 and the bottom NMOS transistors BPD1 and BPD2 may be referred to as pull-down transistors, and the top PMOS transistors TPG1 and TPG2 and the bottom NMOS transistors BPG1 and BPG2 may be referred to as pass-gate transistors.

As described above, both the top memory cell 210 and the bottom memory cell 220 may have the 6T structure including six transistors. For example, the bottom memory cell 220 may include two PMOS transistors and four NMOS transistors, and two pass gate transistors included in the bottom memory cell 220 may be implemented as NMOS transistors. For example, the top memory cell 210 may include four PMOS transistors and two NMOS transistors, and two pass gate transistors included in the top memory cell 210 may be implemented as PMOS transistors. In other words, the bottom memory cell 220 may include two NMOS pass-gate transistors and the top memory cell 210 may include two PMOS pass-gate transistors. In this example, a high density cell (HDC), which is a memory cell of a general SRAM, may be used as the bottom memory cell 220, and a custom cell in which pass gate transistors of the HDC are changed from NMOS transistors to PMOS transistors may be used as the top memory cell 210.

In some example embodiments, top switches TSW1, TSW2 and TSW3 for electrically connecting/disconnecting the top memory cell 210 to/from the middle node NM may be provided, and bottom switches BSW1, BSW2 and BSW3 for electrically connecting/disconnecting the bottom memory cell 220 to/from the middle node NM may be provided. For example, the top switches TSW1 to TSW3 and the bottom switches BSW1 to BSW3 may not be included in the top memory cell 210 and the bottom memory cell 220 and/or may not be included in the memory cell array 100. In FIG. 3, the top switches TSW1 to TSW3 and the bottom switches BSW1 to BSW3 are illustrated to describe an electrical connection/disconnection between the memory cells 210 and 220 and the middle node NM depending on the operating states of the memory cells 210 and 220. For example, the top switches TSW1 to TSW3 and the bottom switches BSW1 to BSW3 may be included in a peripheral circuit that drives the memory cells 210 and 220 and the memory cell array 100. For example, the top switches TSW1 to TSW3 and the bottom switches BSW1 to BSW3 may be included in a row decoder (e.g., a row decoder 520 in FIG. 8) and/or a column decoder (e.g., a column decoder 530 in FIG. 8).

Figure 4A:
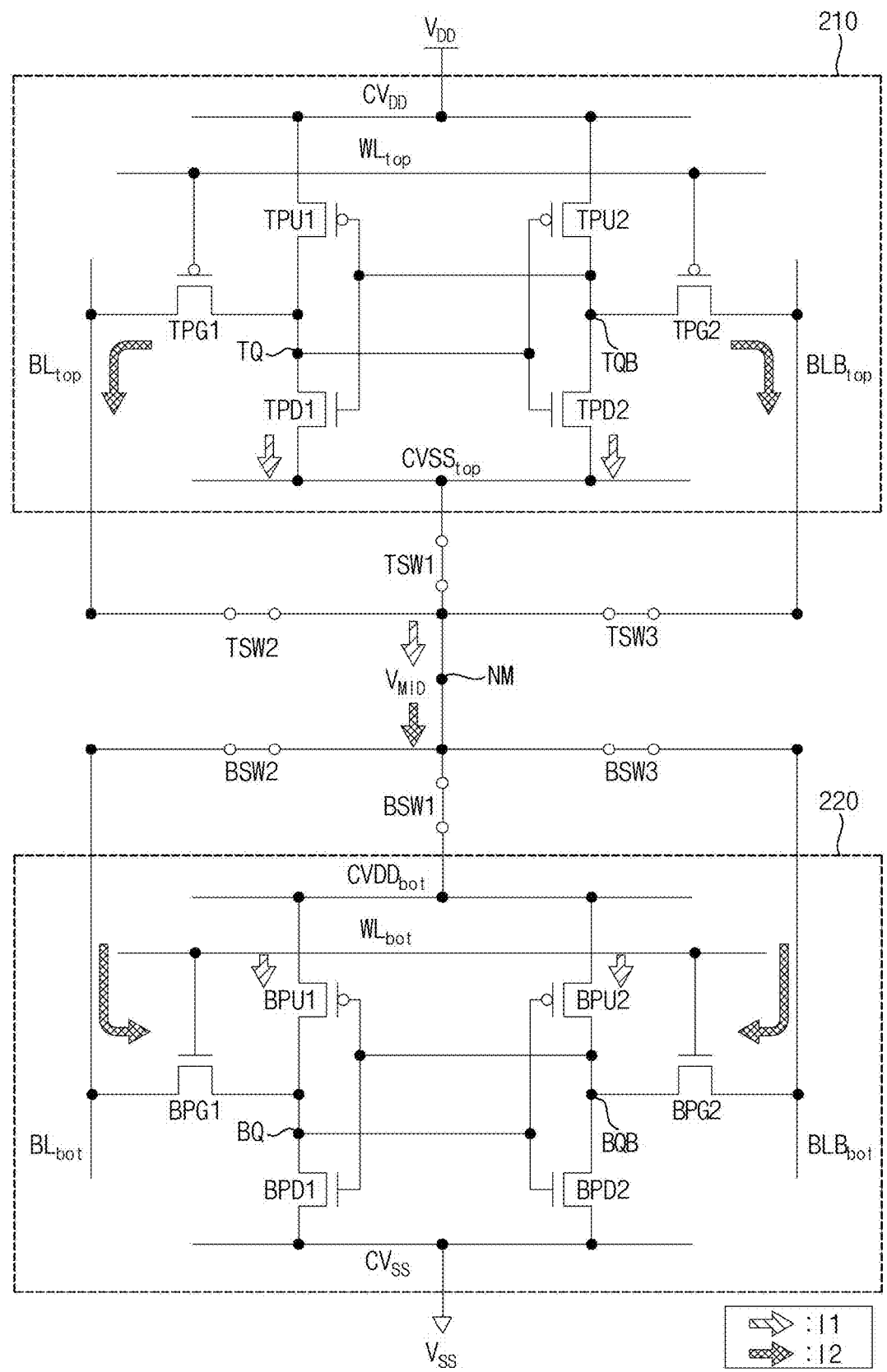
FIGS. 4A and 4B are diagrams for describing an operation of a top memory cell and a bottom memory cell in FIG. 3.
Figure 4B:
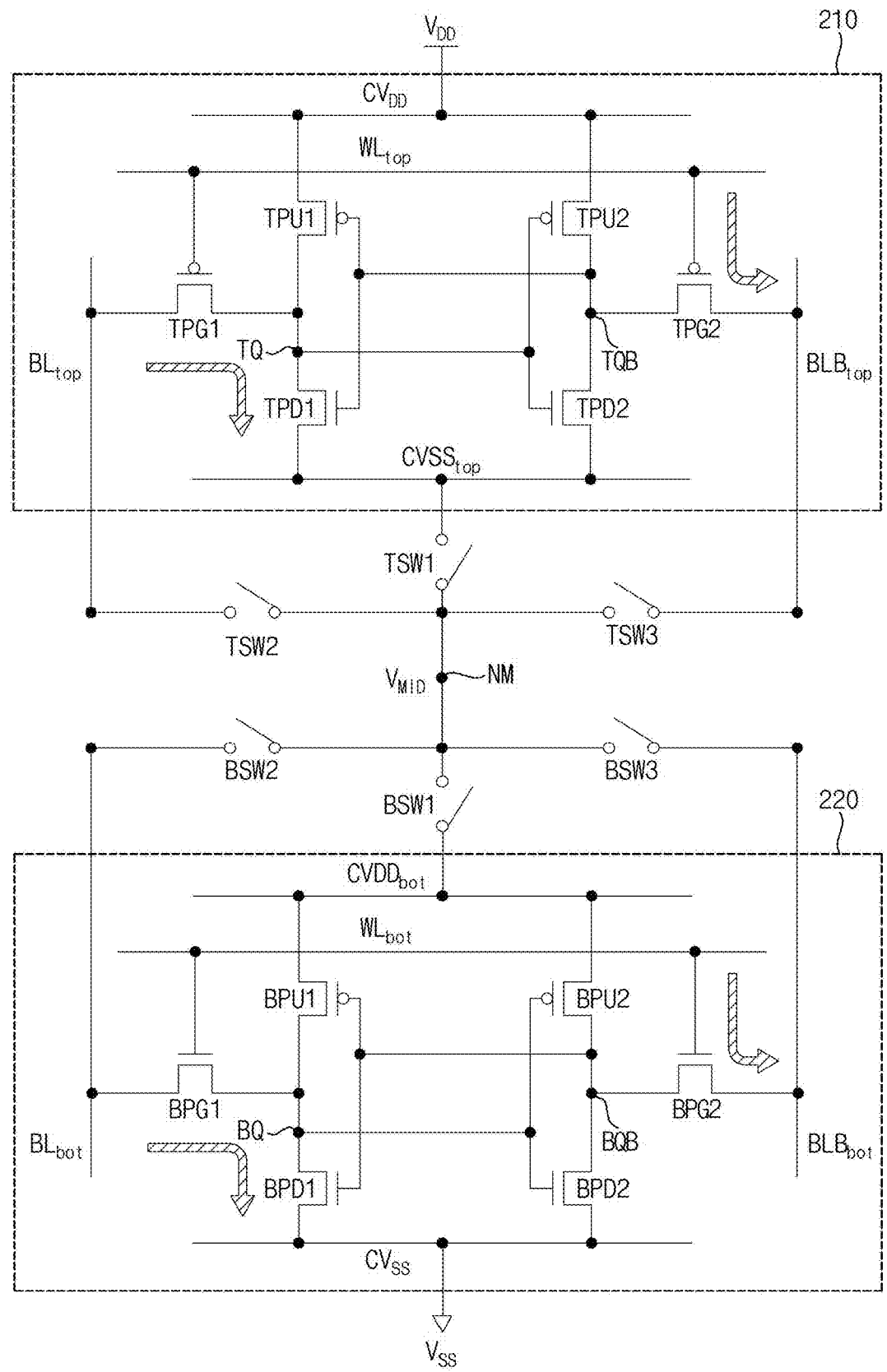

FIGS. 4A and 4B are diagrams for describing an operation of a top memory cell and a bottom memory cell in FIG. 3.

Referring to FIG. 4A, an example where the write operation and the read operation are not performed on the top memory cell 210 and the bottom memory cell 220 is illustrated. In other words, FIG. 4A illustrates an operation in a standby state or a hold state. For example, as illustrated in FIG. 4A, all of the top switches TSW1 to TSW3 and the bottom switches BSW1 to BSW3 may be turned on and may be closed.

When the write operation and the read operation are not performed on the top memory cell 210 and the bottom memory cell 220, the top ground voltage $CVSS_{top}$ and the bottom power supply voltage $CVDD_{bot}$ may be electrically connected to the middle node NM and the middle voltage $V_{MID}$, and leakage current may be recycled as illustrated by arrows "I1." For example, both the top ground voltage $CVSS_{top}$ and the bottom power supply voltage $CVDD_{bot}$ may be substantially equal to the middle voltage $V_{MID}$.

In addition, when the write operation and the read operation are not performed on the top memory cell 210 and the bottom memory cell 220, all of the top bitline $BL_{top}$, the top complementary bitline $BLB_{top}$, the bottom bitline $BL_{bot}$ and the bottom complementary bitline $BLB_{bot}$ may be electrically connected to the middle node NM and the middle voltage $V_{MID}$, and leakage current may be recycled as illustrated by arrows "I2." As compared with a conventional scheme, all bitlines and complementary bitlines may be additionally connected to the middle node NM in the example of FIG. 4A. Accordingly, the leakage current may be completely recycled, and the leakage current may be further reduced by forming $V_{MID}=0.5*V_{DD}$ stably.

Referring to FIG. 4B, an example where the write operation or the read operation is performed on the top memory cell 210 and the bottom memory cell 220 is illustrated. For example, as illustrated in FIG. 4B, all of the top switches TSW1 to TSW3 and the bottom switches BSW1 to BSW3 may be turned off and may be opened.

When the write operation or the read operation is performed on the top memory cell 210 and the bottom memory cell 220, the top ground voltage $CVSS_{top}$ and the bottom power supply voltage $CVDD_{bot}$ may be electrically disconnected (or separated) from the middle node NM and the middle voltage $V_{MID}$, and both the top ground voltage $CVSS_{top}$ and the bottom power supply voltage $CVDD_{bot}$ may become different from the middle voltage $V_{MID}$. For example, the top ground voltage $CVSS_{top}$ may become lower than the middle voltage $V_{MID}$, and the bottom power supply voltage $CVDD_{bot}$ may become higher than the middle voltage $V_{MID}$. In other words, voltages of the top memory cell 210 and the bottom memory cell 220 near the middle node NM may be different from each other. Since the SRAM is vulnerable to variations in transistors due to its cell structure, the voltages should be sufficiently high during operation, and thus it may be necessary to decrease the level of the top ground voltage $CVSS_{top}$ and to increase the level of the bottom power supply voltage $CVDD_{bot}$. For example, the above-described voltage control operation may be required before the wordline is enabled or activated to perform the write operation or the read operation, which will be described with reference to FIGS. 6A and 6B.

In addition, when the write operation or the read operation is performed on the top memory cell 210 and the bottom memory cell 220, all of the top bitline $BL_{top}$, the top complementary bitline $BLB_{top}$, the bottom bitline $BL_{bot}$ and the bottom complementary bitline $BLB_{bot}$ may be electrically disconnected from the middle node NM and the middle voltage $V_{MID}$. In this example, the top memory cell 210 may be enabled through the top wordline $WL_{top}$, the top bitline $BL_{top}$, and the top complementary bitline $BLB_{top}$, the bottom memory cell 220 may be enabled through the bottom wordline $WL_{bot}$, the bottom bitline $BL_{bot}$ and the bottom complementary bitline $BLB_{bot}$, and current may be generated as illustrated by arrows to perform the write operation or the read operation.

In some example embodiments, the pass gate transistors included in the top memory cell 210 may be implemented as PMOS transistors TPG1 and TPG2, and the pass gate transistors included in the bottom memory cell 220 may be implemented as NMOS transistors BPG1 and BPG2. Thus, the top memory cell 210 and the bottom memory cell 220 may be substantially simultaneously enabled, and the write operation or the read operation may be substantially simultaneously performed on the top memory cell 210 and the bottom memory cell 220. For example, the top memory cell 210 may be enabled when a voltage level of the top wordline $WL_{top}$ becomes a logic low level "0," and the bottom memory cell 220 may be enabled when a voltage level of the bottom wordline $WL_{bot}$ becomes a logic high level "1." For example, data "0" and "1" in the top memory cell 210 may correspond to $0.5*V_{DD}$ and $V_{DD}$, respectively, and data "0" and "1" in the bottom memory cell 220 may correspond to $V_{SS}$ (e.g., about 0V) and $0.5*V_{DD}$, respectively.

Figure 5A:
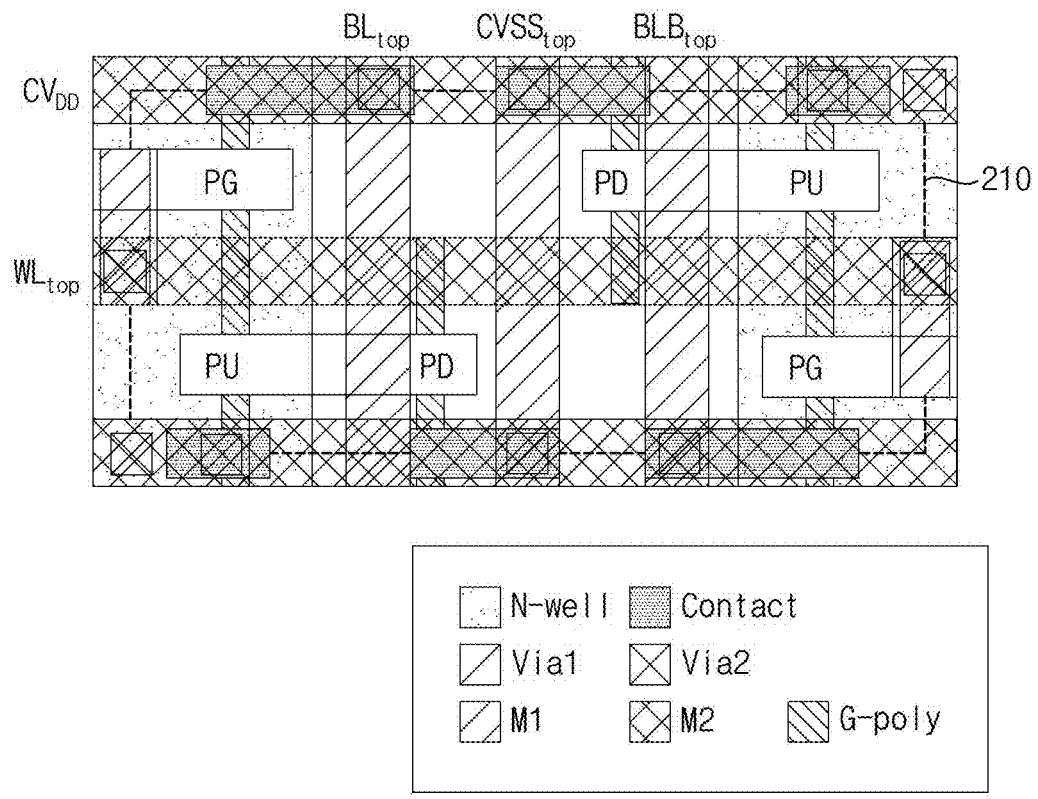
FIGS. 5A and 5B are plan views of an example layout of a top memory cell and a bottom memory cell in FIG. 3.
Figure 5B:
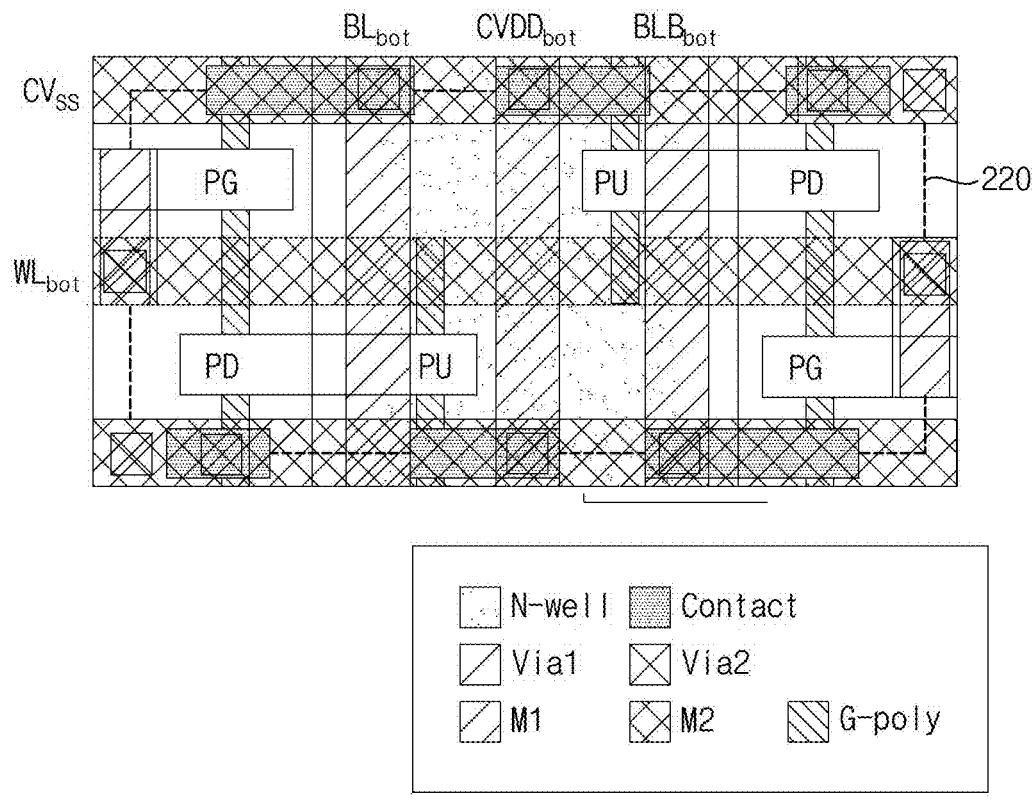

FIGS. 5A and 5B are plan views of an example layout of a top memory cell and a bottom memory cell in FIG. 3.

Referring to FIGS. 5A and 5B, FIG. 5A illustrates a layout of the top memory cell 210 formed on a semiconductor substrate, and FIG. 5B illustrates a layout of the bottom memory cell 220 formed on a semiconductor substrate. In FIGS. 5A and 5B, "N-well" represents an n-type well region, "Contact" represents a contact pattern, "M1" and "M2" represent metal patterns formed on different layers, "Via1" and "Via2" represent vias for connecting different layers, and "G-poly" represents a gate polysilicon pattern. In addition, "PU", "PD" and "PG" represent a pull-up transistor, a pull-down transistor and a pass gate transistor, respectively.

As illustrated in FIG. 5B, the layout of the bottom memory cell 220 may be substantially the same as that of the HDC which is currently used. For example, in the bottom memory cell 220, the pull-up transistors PU may be implemented as PMOS transistors, and the pull-down transistors PD and the pass gate transistors PG may be implemented as NMOS transistors.

As illustrated in FIG. 5A, the layout of the top memory cell 210 may be partially changed from the layout of the bottom memory cell 220 of FIG. 5B. For example, in the top memory cell 210, the pull-up transistors PU and the pass gate transistors PG may be implemented as PMOS transistors, and the pull-down transistors PD may be implemented as NMOS transistors. In other words, the pass gate transistors PG may be implemented as PMOS transistors unlike that of the HDC illustrated in FIG. 5B. Furthermore, the custom cell illustrated in FIG. 5A may be formed by changing some elements of the HDC illustrated in FIG. 5B. For example, the layout of the top memory cell 210 of FIG. 5A may be implemented by swapping positions of n-type and p-type well regions in the layout of the bottom memory cell 220 of FIG. 5B, by swapping positions of $CV_{DD}$ and $CV_{SS}$ lines in the layout of the bottom memory cell 220 of FIG. 5B, and by swapping positions of pull-up and pull-down transistors PU and PD in the layout of the bottom memory cell 220 of FIG. 5B.

In some example embodiments, the area of the top memory cell 210 and the area of the bottom memory cell 220 may be substantially equal to each other. As described above, the top memory cell 210 having PMOS pass gate transistors may be implemented using the custom cell that has the same area as the HDC. Accordingly, the memory cell array 100 and the SRAM may be manufactured with high process versatility because conventional manufacturing processes may be utilized. In addition, in the memory cell array 100, the number of memory cells may not be reduced and the area of each memory cell may not be reduced.

Figure 6A:
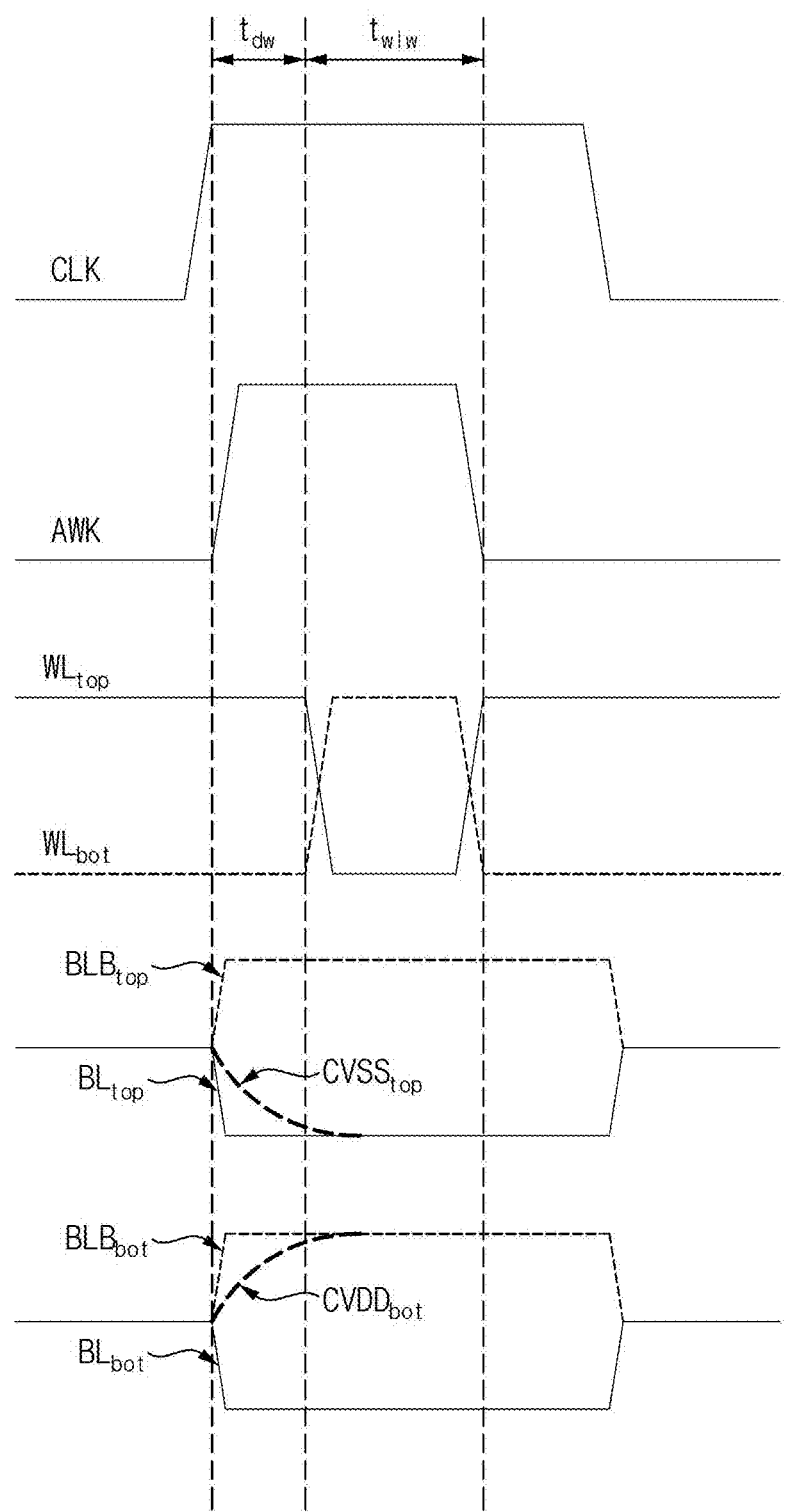
FIGS. 6A and 6B are diagrams for describing an operation of a top memory cell and a bottom memory cell in FIG. 3.
Figure 6B:
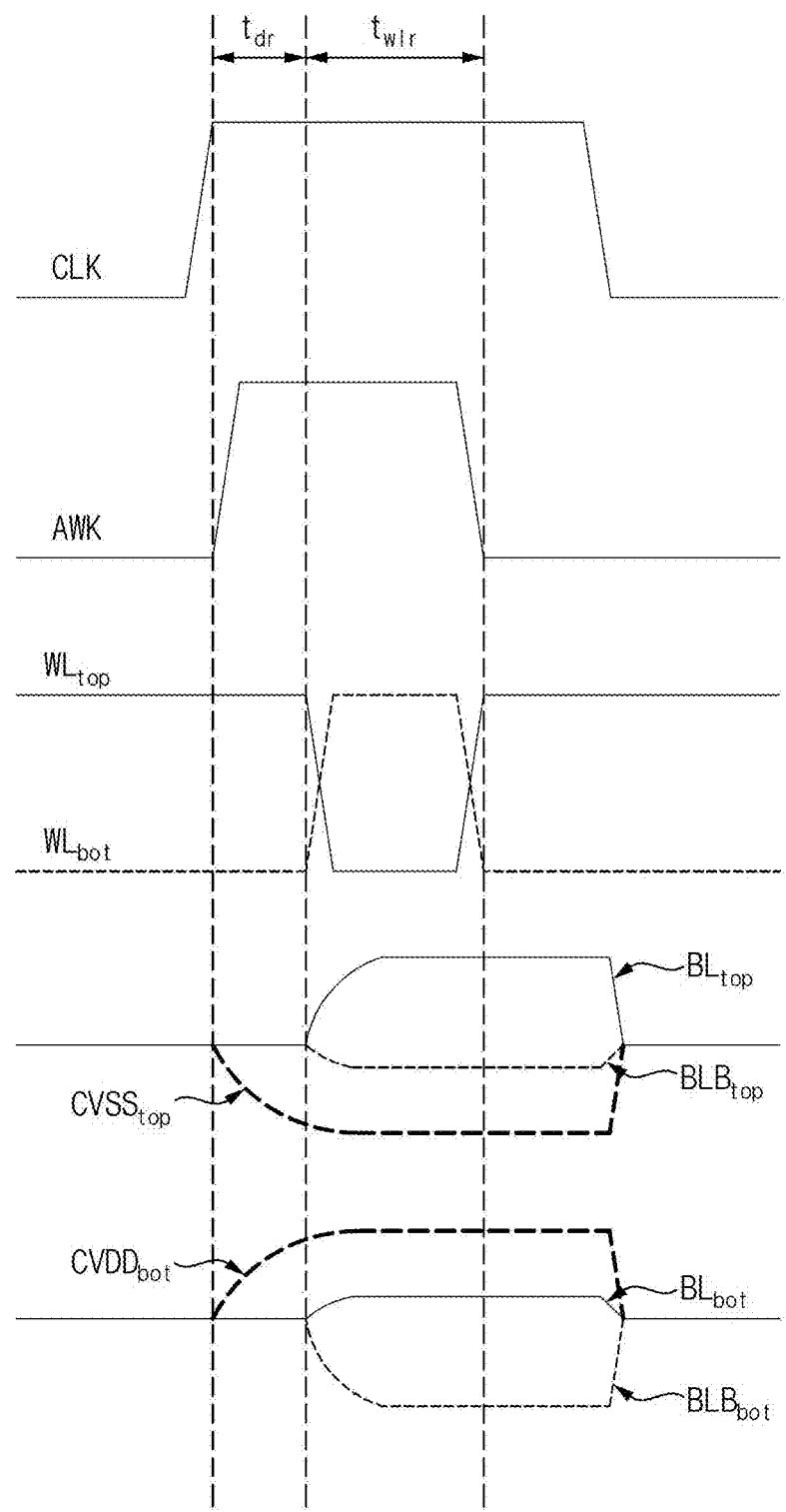

FIGS. 6A and 6B are diagrams for describing an operation of a top memory cell and a bottom memory cell in FIG. 3.

Referring to FIGS. 6A and 6B, FIG. 6A illustrates changes in signals and voltage levels when the write operation is performed on the top memory cell 210 and the bottom memory cell 220, and FIG. 6B illustrates changes in signals and voltage levels when the read operation is performed on the top memory cell 210 and the bottom memory cell 220.

Due to its cell structure, SRAM is particularly susceptible to variations in transistors. Therefore, to ensure stable operation, the voltages should be sufficiently high during the SRAM's operation. Thus, before the wordline is enabled, the level of the top ground voltage $CVSS_{top}$ should be decreased and the level of the bottom power supply voltage $CVDD_{bot}$ should be increased. Therefore, the memory cell array 100 according to example embodiments may operate in two operation phases, which include a first time interval (or operation phase) before the wordline is enabled (or activated) and a second time interval during which the wordline is enabled. For example, a time interval $t_{dw}$ in FIG. 6A and a time interval $t_{dr}$ in FIG. 6B may correspond to the first time interval, and the first time interval may be referred to as a delay interval. For example, a time interval $t_{wlw}$ in FIG. 6A and a time interval $t_{wlr}$ in FIG. 6B may correspond to the second time interval, and the second time interval may be referred to as a wordline enable interval. In addition, in FIGS. 6A and 6B, "CLK" and "AWK" represent a clock signal and a control signal, respectively, that are applied to the peripheral circuit driving the memory cell array 100.

As illustrated in FIG. 6A, when the write operation is performed on the top memory cell 210 and the bottom memory cell 220, in the first time interval $t_{dw}$, the top wordline $WL_{top}$ and the bottom wordline $WL_{bot}$ may not be enabled (e.g., may be disabled), and the clock signal CLK and the control signal AWK may be activated to a logic high level. In response to the control signal AWK of the high level, the top ground voltage $CVSS_{top}$ of the top memory cell 210 may decrease, and the bottom power supply voltage $CVDD_{bot}$ of the bottom memory cell 220 may increase. For example, the top ground voltage $CVSS_{top}$ of the top memory cell 210, and the bottom power supply voltage $CVDD_{bot}$ of the bottom memory cell 220 may have an inverse relationship. In addition, the top bitline $BL_{top}$ and the top complementary bitline $BLB_{top}$ of the top memory cell 210 may be pre-developed, and the bottom bitline $BL_{bot}$ and the bottom complementary bitline $BLB_{bot}$ of the bottom memory cell 220 may be pre-developed.

When the write operation is performed on the top memory cell 210 and the bottom memory cell 220, in the second time interval $t_{wlw}$ after the first time interval $t_{dw}$, the top wordline $WL_{top}$ of the top memory cell 210 may be enabled such that a voltage at the top wordline $WL_{top}$ corresponds to a logic low level, and the bottom wordline $WL_{bot}$ of the bottom memory cell 220 may be enabled such that a voltage at the bottom wordline $WL_{bot}$ corresponds to a logic high level. Thus, for stable operation, the top ground voltage $CVSS_{top}$ may continuously decrease and the bottom power supply voltage $CVDD_{bot}$ may continuously increase. As an example, the top ground voltage $CVSS_{top}$ may continue to decrease for a period of time in the second time interval $t_{wlw}$ and then stabilize, and the bottom power supply voltage $CVDD_{bot}$ may continue to increase for a period of time in the second time interval $t_{wlw}$ and then stabilize.

In the above-described write operation, current may instantaneously flow through the pass gate transistors due to pre-development, and thus the write-ability may be improved (or enhanced). In addition, the write operation may start by enabling the top wordline $WL_{top}$ before the top ground voltage $CVSS_{top}$ becomes completely equal to the ground voltage $V_{SS}$, and thus the write-ability may be improved by the boosted CVSS. Similarly, the write operation may start by enabling the bottom wordline $WL_b$ before the bottom power supply voltage $CVDD_{bot}$ becomes completely equal to the power supply voltage $V_{DD}$, and thus the write-ability may be improved by the lowered CVDD.

As illustrated in FIG. 6B, when the read operation is performed on the top memory cell 210 and the bottom memory cell 220, in the first time interval $t_{dr}$, the top wordline $WL_{top}$ and the bottom wordline $WL_{bot}$ may not be enabled, the clock signal CLK and the control signal AWK may be activated to a logic high level. In response to the control signal AWK of the high level, the top ground voltage $CVSS_{top}$ of the top memory cell 210 may decrease, and the bottom power supply voltage $CVDD_{bot}$ of the bottom memory cell 220 may increase.

When the read operation is performed on the top memory cell 210 and the bottom memory cell 220, in the second time interval $t_{wlr}$ after the first time interval $t_{dr}$, the top wordline $WL_{top}$ of the top memory cell 210 may be enabled such that the voltage at the top wordline $WL_{top}$ corresponds to a logic low level, and the bottom wordline $WL_{bot}$ of the bottom memory cell 220 may be enabled such that the voltage at the bottom wordline $WL_{bot}$ corresponds to a logic high level. Thus, for stable operation, the top ground voltage $CVSS_{top}$ may continuously decrease and the bottom power supply voltage $CVDD_{bot}$ may continuously increase. In addition, the top bitline $BL_{top}$ and the top complementary bitline $BLB_{top}$ of the top memory cell 210 may be developed, and the bottom bitline $BL_{bot}$ and the bottom complementary bitline $BLB_{bot}$ of the bottom memory cell 220 may be developed.

In the above-described read operation, the top bitline $BL_{top}$ and the top complementary bitline $BLB_{top}$ may be precharged to $V_{MID}=0.5*V_{DD}$, and thus the read disturbance may be reduced and the read-stability may be improved by the suppressed BL. In addition, the read operation may start by enabling the top wordline $WL_{top}$ before the top ground voltage $CVSS_{top}$ becomes completely equal to the ground voltage $V_{SS}$, and thus the read disturbance may increase and the read-stability may be degraded (or deteriorated) due to the boosted CVSS. As a result, the above-mentioned two effects may occur at once, and the read-stability may be improved. Similarly, in the above-described read operation, the bottom bitline $BL_{bot}$ and the bottom complementary bitline $BLB_{bot}$ may be precharged to $V_{MID}=0.5*V_{DD}$, and thus the read disturbance may be reduced and the read-stability may be improved by the suppressed BL. In addition, the read operation may start by enabling the bottom wordline $WL_{bot}$ before the bottom power supply voltage $CVDD_{bot}$ becomes completely equal to the power supply voltage $V_{DD}$, and thus the read disturbance may increase and the read-stability may be degraded due to the lowered CVDD. As a result, the above-mentioned two effects may occur at once, and the read-stability may be improved.

FIG. 7 is a block diagram illustrating a memory cell array of an SRAM according to example embodiments. The descriptions repeated with FIG. 1 will be omitted for brevity.

Referring to FIG. 7, a memory cell array 100*a* of an SRAM includes a top memory cell array 110*a* and a bottom memory cell array 120*a*.

The top memory cell array 110*a* includes a plurality of top memory cells TMC11, . . . , TMC1*q*, TMC21, . . . , TMC2*q*, . . . , TMCp1, . . . , TMCpq, where each of p and q is a natural number greater than or equal to two. Each of the plurality of top memory cells TMC1*l* to TMC1*q*, TMC21 to TMC2*q* and TMCp1 to TMCpq may be substantially the same as the top memory cell TMC and the top memory cell 210 described with reference to FIGS. 2, 3, 4A, 4B, 5A, 5B, 6A and 6B.

The plurality of top memory cells TMC11 to TMC1*q*, TMC21 to TMC2*q* and TMCp1 to TMCpq may be arranged in the 2D matrix formation. For example, the top memory cell array 110*a* may include a plurality of top memory rows TRW1, TRW2, . . . , TRWp and at least one top dummy row DTRW1. Each of the plurality of top memory rows TRW1 to TRWp may include one or more of the plurality of top memory cells TMC11 to TMC1q, TMC21 to TMC2q and TMCp1 to TMCpq. For example, a first top memory row TRW1 may include the top memory cells TMC11 to TMC1q, a second top memory row TRW2 may include the top memory cells TMC21 to TMC2q, and a p-th top memory row TRWp may include the top memory cells TMCp1 to TMCpq. The at least one top dummy row DTRW1 may not include any top memory cells. In other words, no memory cells may be provided in the at least one top dummy row DTRW1.

The bottom memory cell array 120a includes a plurality of bottom memory cells BMC11, . . . , BMC1q, BMC21, . . . , BMC2q, . . . , BMCp1, . . . , BMCpq. Each of the plurality of bottom memory cells BMC1l to BMC1q, BMC21 to BMC2q and BMCp1 to BMCpq may be substantially the same as the bottom memory cell BMC and the bottom memory cell 220 described with reference to FIGS. 2, 3, 4A, 4B, 5A, 5B, 6A and 6B.

The plurality of bottom memory cells BMC11 to BMC1q, BMC21 to BMC2q and BMCp1 to BMCpq may be arranged in the 2D matrix formation. For example, the bottom memory cell array 120a may include a plurality of bottom memory rows BRW1, BRW2, . . . , BRWp and at least one bottom dummy row DBRW1. Each of the plurality of bottom memory rows BRW1 to BRWp may include one or more of the plurality of bottom memory cells BMC11 to BMC1q, BMC21 to BMC2q and BMCp1 to BMCpq. For example, a first bottom memory row BRW1 may include the bottom memory cells BMC11 to TBC1q, a second bottom memory row BRW2 may include the bottom memory cells BMC21 to BMC2q, and a p-th bottom memory row BRWp may include the bottom memory cells BMCp1 to BMCpq. The at least one bottom dummy row DBRW1 may not include any bottom memory cells.

In some example embodiments, as will be described with reference to FIGS. 12A and 12B, each of the at least one top dummy row DTRW1 and the at least one bottom dummy row DBRW1 may include a dummy memory cell.

As described with reference to FIG. 1, the top/bottom memory cells (e.g., the memory cells TMC11 and BMC11) operating as a pair may be connected to each other through a middle node NM1a. Unlike the example of FIG. 1, the middle node NM1a may be shared by the top memory cells TMC11 to TMC1q, TMC21 to TMC2q and TMCp1 to TMCpq, and the middle node NM1a may be shared by the bottom memory cells BMC11 to BMC1q, BMC21 to BMC2q and BMCp1 to BMCpq. In other words, all of the memory cells of the top memory cell array 110a and the bottom memory cell array 120a share the same middle node NM1a.

In some example embodiments, the top memory cell array 110a may further include top nodes TN1, . . . , TNq for electrical connections with the middle node NM1a, and the bottom memory cell array 120a may further include bottom nodes BN1 to BNq for electrical connections with the middle node NM1a. For example, the top memory cell TMC11 and the bottom memory cell BMC11 may be connected to each other through the top node TN1, the middle node NM1a and the bottom node BN1, and the top memory cell TMC1q and the bottom memory cell BMC1q may be connected to each other through the top node TNq, the middle node NM1a and the bottom node BNq. For example, each of the top nodes TN1 to TNq may correspond to a node between the top ground voltage $CVSS_{top}$ and the top switch TSW1 in FIG. 3, and each of the bottom nodes BN1 to BNq may correspond to a node between the bottom switch BSW1 and the bottom power supply voltage $CVDD_{bot}$ in FIG. 3.

In some example embodiments, the top nodes TN1 to TNq may be included in the at least one top dummy row DTRW1, and the bottom nodes BN1 to BNq may be included in the at least one bottom dummy row DBRW1. In other words, the at least one top dummy row DTRW1 and the at least one bottom dummy row DBRW1 may be regions including the top nodes TN1 to TNq and the bottom nodes BN1 to BNq for the electrical connections with the middle node NM1a, rather than regions that include memory cells for storing actual data. In addition, the at least one top dummy row DTRW1 and the at least one bottom dummy row DBRW1 may be regions additionally including configurations for controlling the top ground voltage $CVSS_{top}$ and the bottom power supply voltage $CVDD_{bot}$.

In some example embodiments, one of the top nodes TN1 to TNq may be shared by top memory cells that are included in different top memory rows and in the same top memory column. For example, the top node TN1 may be shared by the top memory cells TMC11, TMC21 and TMCp1 that are included in the top memory rows TRW1 to TRWp and in a first top memory column, and the top node TNq may be shared by the top memory cells TMC1q, TMC2q and TMCpq that are included in the top memory rows TRW1 to TRWp and in a q-th top memory column.

In some example embodiments, one of the bottom nodes BN1 to BNq may be shared by bottom memory cells that are included in different bottom memory rows and in the same bottom memory column. For example, the bottom node BN1 may be shared by the bottom memory cells BMC11, BMC21 and BMCp1 that are included in the bottom memory rows BRW1 to BRWp and in a first bottom memory column, and the bottom node BNq may be shared by the bottom memory cells BMC1q, BMC2q and BMCpq that are included in the bottom memory rows BRW1 to BRWp and in a q-th bottom memory column.

As described above, the memory cell array 100a may be implemented with a structure in which the middle node NM1a is shared and/or a structure in which the top nodes TN1 to TNq and the bottom nodes BN1 to BNq are shared, and thus the memory cell array 100a may have relatively reduced size and improved performance.

FIG. 8 is a block diagram illustrating an SRAM according to example embodiments.

Referring to FIG. 8, an SRAM 500 includes a memory cell array 510, a row decoder 520 and a column decoder 530. The SRAM 500 may further include a data input/output (I/O) circuit 540 and a control circuit 550.

The memory cell array 510 includes a top memory cell array 512 and a bottom memory cell array 514. The memory cell array 510 may be the memory cell array according to example embodiments. For example, the memory cell array 510 may be implemented with the FSVS structure, and may be implemented as described with reference to FIGS. 1, 2, 3, 4A, 4B, 5A, 5B, 6A, 6B and 7.

The control circuit 550 may receive a command CMD and an address ADDR from an outside (e.g., from a memory controller), and may control operations of the SRAM 500 based on the command CMD and the address ADDR. For example, the control circuit 550 may generate control signals CONR for controlling the row decoder 520, control signals CONC for controlling the column decoder 530, and control signals COND for controlling the data I/O circuit 540, based on the command CMD. For example, the control circuit 550 may generate a row address RA and a column address CA based on the address ADDR. The control circuit 550 may provide the row address RA to the row decoder 520, and may provide the column address CA to the column decoder 530.

The row decoder 520 may be connected to the memory cell array 510 through a plurality of wordlines WLs. The row decoder 520 may control the operation of the memory cell array 510 based on the row address RA and the control signals CONR. For example, during the write/read operations, the row decoder 520 may determine at least one of the plurality of wordlines WLs as a selected wordline.

The column decoder 530 may be connected to the memory cell array 510 through a plurality of bitlines BLs. The plurality of bitlines BLs may include bitlines and complementary bitlines. The column decoder 530 may control the operation of the memory cell array 510 based on the column address CA and the control signals CONC. For example, during the write/read operations, the column decoder 530 may determine at least one of the plurality of bitlines BLs as a selected bitline.

The data I/O circuit 540 may be connected to the column decoder 530. The data I/O circuit 540 may provide data DAT to be written into the cell array 510 via the column decoder 530, or may provide data DAT read from the memory cell array 510 to the outside of the SRAM 500 via the column decoder 530.

Figure 9:
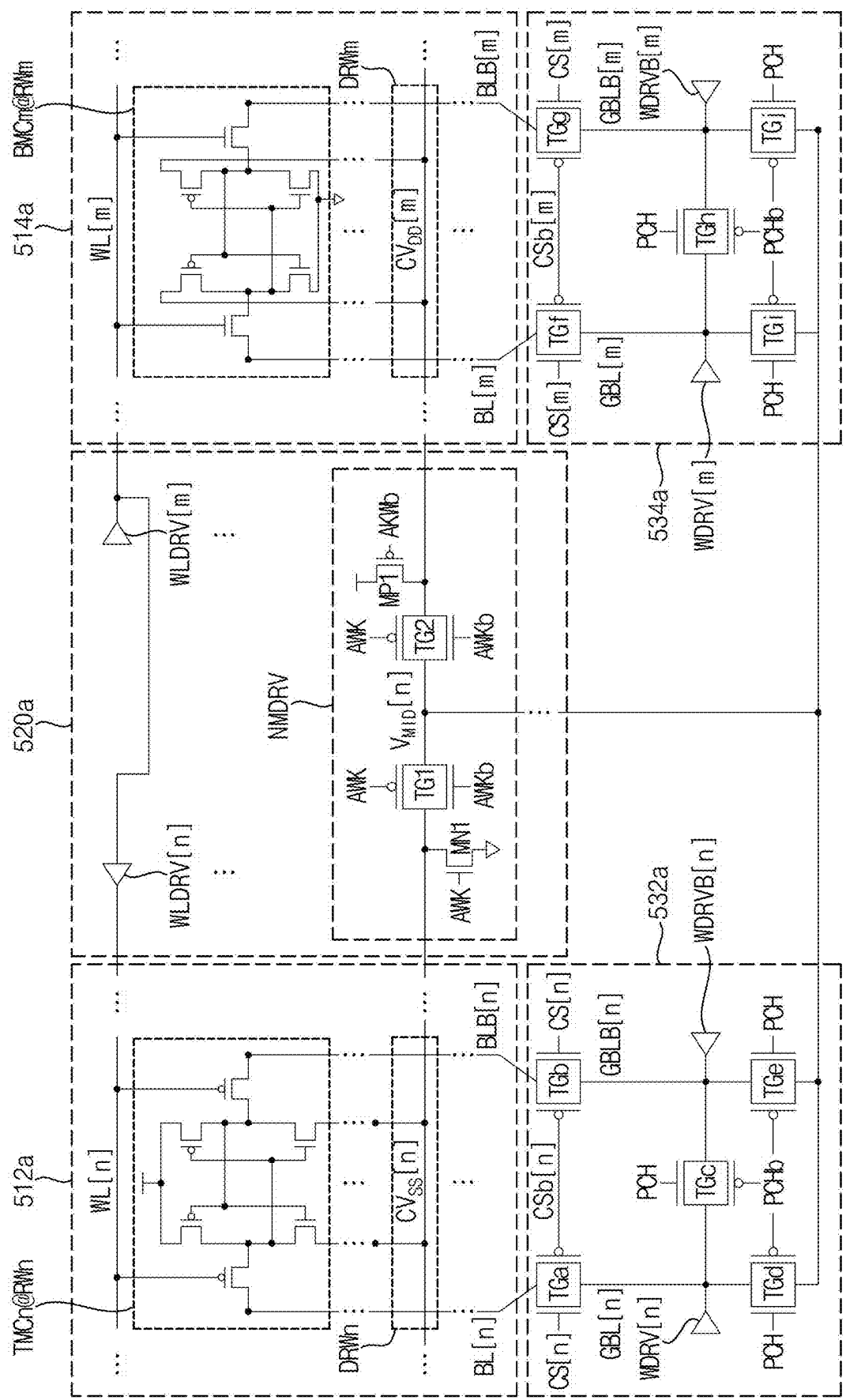
FIG. 9 is a circuit diagram illustrating an example of an SRAM of FIG. 8.

FIG. 9 is a circuit diagram illustrating an example of an SRAM of FIG. 8.

Referring to FIG. 9, an SRAM may include a top memory cell array 512a, a bottom memory cell array 514a, a row decoder 520a and column decoders 532a and 534a. For convenience of illustration, FIG. 9 illustrates only elements corresponding to a part of the memory cell array 510, a part of the row decoder 520 and a part of the column decoder 530 in FIG. 8. Elements corresponding to the data I/O circuit 540 and the control circuit 550 in FIG. 8 are omitted in FIG. 9.

The top memory cell array 512a and the bottom memory cell array 514a may be implemented as illustrated in FIG. 7.

For example, the top memory cell array 512a may include a top memory row RWn and a top dummy row DRWn, and the top memory row RWn may include a top memory cell TMCn@RWn. The top memory cell TMCn@RWn may be connected to a top wordline WL[n], a top bitline BL[n] and a top complementary bitline BLB[n], and may be connected to the power supply voltage $V_{DD}$ and a top ground voltage $CV_{SS}[n]$. The top dummy row DRWn may include a top node, e.g., a node at which the top ground voltage $CV_{SS}[n]$ is formed. The top node may be an element for an electrical connection with a middle node, e.g., a node at which a middle voltage $V_{MID}[n]$ is formed.

For example, the bottom memory cell array 514a may include a bottom memory row RWm and a bottom dummy row DRWm, and the bottom memory row RWm may include a bottom memory cell BMCm@RWm operating as a pair with the top memory cell TMCn@RWn. The bottom memory cell BMCm@RWm may be connected to a bottom wordline WL[m], a bottom bitline BL[m] and a bottom complementary bitline BLB[m], and may be connected to a bottom power supply voltage $CV_{DD}[m]$ and the ground voltage ss. The bottom dummy row DRWm may include a bottom node, e.g., a node at which the bottom power supply voltage $CV_{DD}[m]$ is formed. The bottom node may be an element for an electrical connection with the middle node.

The row decoder 520a may include a first wordline driver WLDRV[n], a second wordline driver WLDRV[m] and a middle node driver NMDRV.

The first wordline driver WLDRV[n] may be connected to the top wordline WL[n], and may be used to drive the top wordline WL[n]. The second wordline driver WLDRV[m] may be connected to the bottom wordline WL[m], and may be used to drive the bottom wordline WL[m]. The middle node driver NMDRV may be connected to the middle node, and may be used to electrically connect/disconnect the middle node to/from the top memory cell TMCn@RWn and the bottom memory cell BMCm@RWm.

The middle node driver NMDRV may include transmission gates TG1 and TG2, an NMOS transistor MN1 and a PMOS transistor MP1.

The transmission gate TG1 may be connected between the top node and the middle node, e.g., between the top ground voltage $CV_{SS}[n]$ and the middle voltage $V_{MID}[n]$. The transmission gate TG2 may be connected between the middle node and the bottom node, e.g., between the middle voltage $V_{MID}[n]$ and the bottom power supply voltage $CV_{DD}[m]$. The NMOS transistor MN1 may be connected between the top node (e.g., the top ground voltage $CV_{SS}[n]$) and the ground voltage $V_{SS}$. The PMOS transistor MP1 may be connected between the power supply voltage $V_{DD}$ and the bottom node (e.g., the bottom power supply voltage $CVDD[m]$).

The transmission gates TG1 and TG2, the NMOS transistor MN1 and the PMOS transistor MP1 may operate in response to control signals AWK and AWKb. For example, the transmission gates TG1 and TG2 may be elements corresponding to the switches TSW1 and BSW1 in FIG. 3. For example, the NMOS transistor MN1 may be an element for decreasing the top ground voltage $CV_{SS}[n]$, and the PMOS transistor MP1 may be an element for increasing the bottom power supply voltage $CV_{DD}[m]$.

The column decoders 532a and 534a may include a first bitline driver 532a and a second bitline driver 534a.

The first bitline driver 532a may be connected to the top bitline BL[n] and the top complementary bitline BLB[n], may be used to drive the top bitline BL[n] and the top complementary bitline BLB[n], and may be connected to the middle node (e.g., the middle voltage $V_{MID}[n]$). The second bitline driver 534a may be connected to the bottom bitline BL[m] and the bottom complementary bitline BLB[m], may be used to drive the bottom bitline BL[m] and the bottom complementary bitline BLB[m], and may be connected to the middle node (e.g., the middle voltage $V_{MID}[n]$).

The first bitline driver 532a may include transmission gates TGa, TGb, TGc, TGd and TGe, and write drivers WDRV[n] and WDRVB[n]. The second bitline driver 534a may include transmission gates TGf, TGg, TGh, TGi and TGj, and write drivers WDRV[m] and WDRVB[m].

The transmission gate TGa may be connected between the top bitline BL[n] and a global bitline GBL[n]. The transmission gate TGb may be connected between the top complementary bitline BLB[n] and a global complementary bitline GBLB[n]. The write driver WDRV[n] may be connected to the global bitline GBL[n]. The write driver WDRVB[n] may be connected to the global complementary bitline GBLB[n]. The transmission gate TGc may be connected between the global bitline GBL[n] and the global complementary bitline GBLB[n]. The transmission gate TGc may also be connected between the write driver WDRV[n] and the write driver WDRVB[n]. The transmission gate TGd may be connected between the global bitline GBL[n] and the middle node (e.g., the middle voltage $V_{MID}[n]$). The transmission gate TGe may be connected between the global complementary bitline GBLB[n] and the middle node (e.g., the middle voltage $V_{MID}[n]$).

The transmission gate TGf may be connected between the bottom bitline BL[m] and a global bitline GBL[m]. The transmission gate TGg may be connected between the bottom complementary bitline BLB[m] and a global complementary bitline GBLB[m]. The write driver WDRV[m] may be connected to the global bitline GBL[m]. The write driver WDRVB[m] may be connected to the global complementary bitline GBLB[m]. The transmission gate TGh may be connected between the global bitline GBL[m] and the global complementary bitline GBLB[m]. The transmission gate TGh may also be connected between the write driver WDRV[m] and the write driver WDRVB[m]. The transmission gate TGi may be connected between the global bitline GBL[m] and the middle node (e.g., the middle voltage $V_{MID}[n]$). The transmission gate TGj may be connected between the global complementary bitline GBLB[m] and the middle node (e.g., the middle voltage $V_{MID}[n]$).

The transmission gates TGa, TGb, TGc, TGd and TGe and the write drivers WDRV[n] and WDRVB[n] may operate in response to control signals CS[n], CSb[n], PCH and PCHn. The transmission gates TGf, TGg, TGh, TGi and TGj and the write drivers WDRV[m] and WDRVB[m] may operate in response to control signals CS[m], CSb[m], PCH and PCHb. For example, the transmission gates TGa, TGb, TGc, TGd and TGe may be elements corresponding to the switches TSW2 and TSW3 in FIG. 3. For example, the transmission gates TGf, TGg, TGh, TGi and TGj may be elements corresponding to the switches BSW2 and BSW3 in FIG. 3.

For example, the control signals AWK and AWKb may be included in the control signals CONR in FIG. 8. For example, the control signals CS[n], CSb[n], CS[m], CSb[m], PCH and PCHb may be included in the control signals CONC in FIG. 8. For example, the control signal AWK may be the same as the control signal AWK in FIGS. 6A and 6B. At least some of elements included in the row decoder 520a and the column decoders 532a and 534a may operate in response to the clock signal CLK in FIGS. 6A and 6B.

Figure 10A:
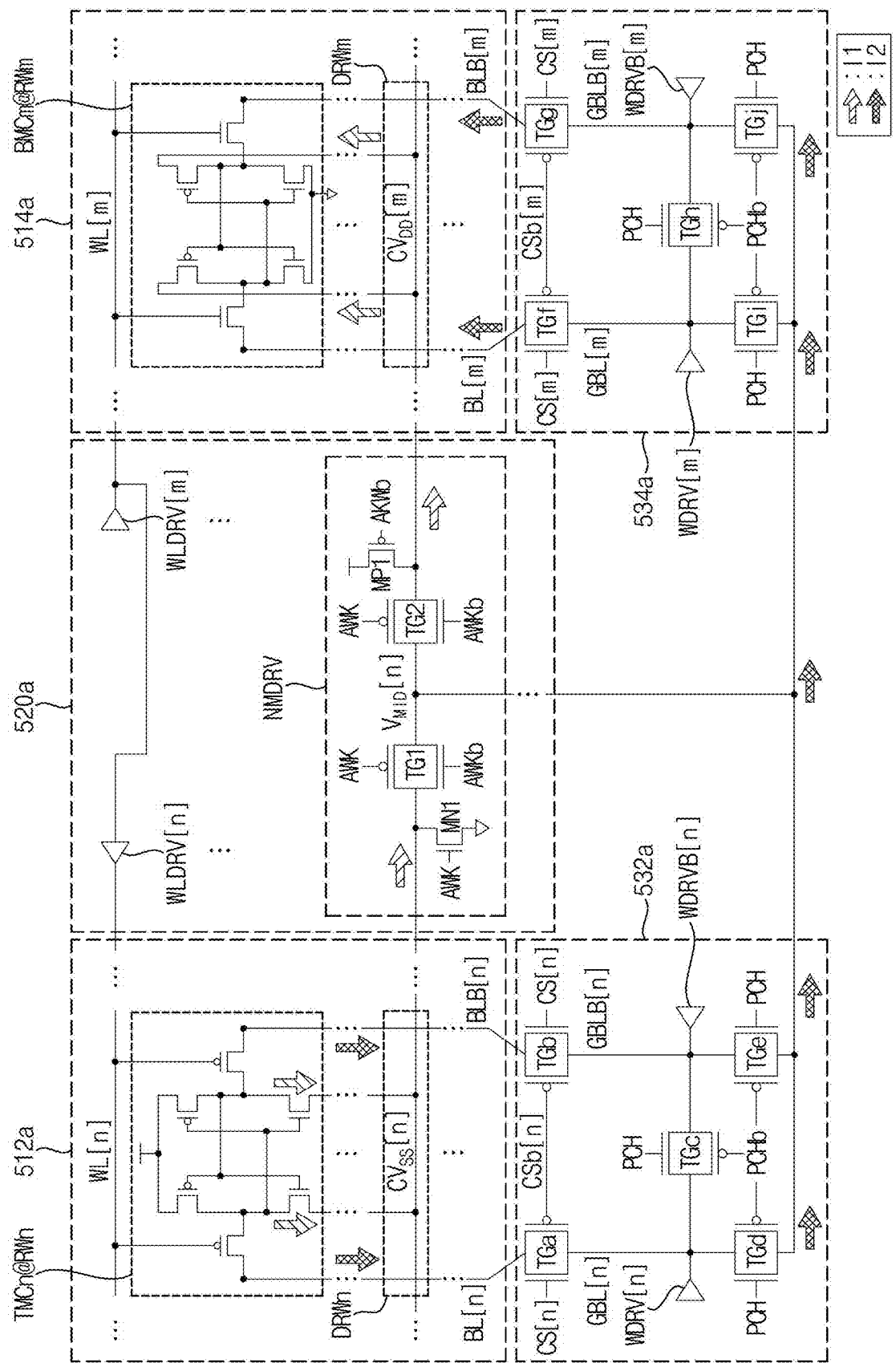
FIGS. 10A, 10B and 10C are diagrams for describing an operation of an SRAM of FIG. 9.
Figure 10B:
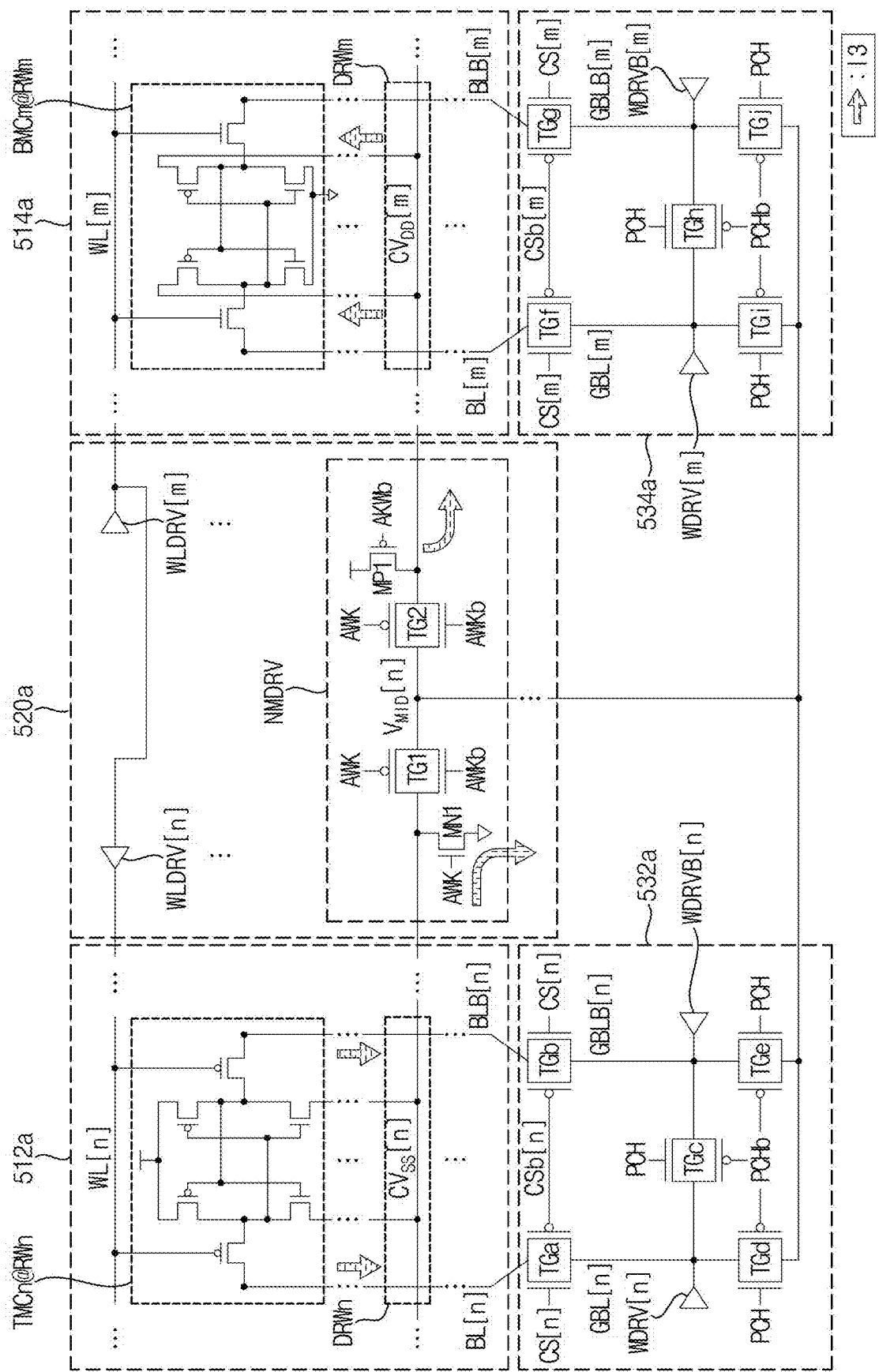
Figure 10C:
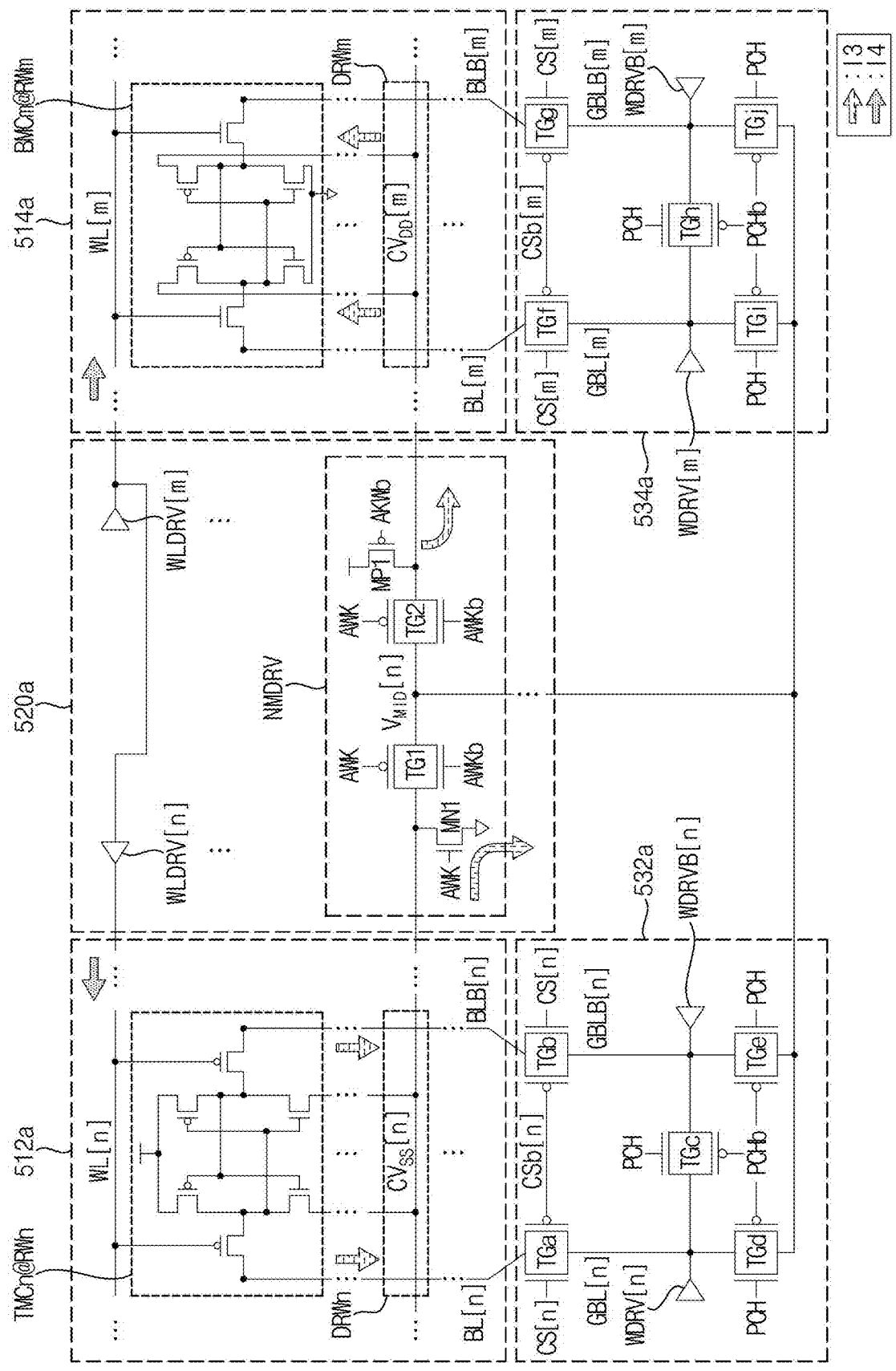

FIGS. 10A, 10B and 10C are diagrams for describing an operation of an SRAM of FIG. 9.

Referring to FIG. 10A, like that described with reference to FIG. 4A, an operation in the standby state or the hold state is illustrated.

For example, the transmission gates TG1 and TG2 may be turned on, the transistors MN1 and MP1 may be turned off, and the wordline drivers WLDRV[n] and WLDRV[m] may be disabled (or deactivated). Thus, the top memory cell TMCn@RWn and the bottom memory cell BMCm@RWm may be electrically connected to the middle node through the top node and the bottom node, and leakage current may be recycled as illustrated by arrows "I1."

In addition, the transmission gates TGa, TGb, TGc, TGd, TGe, TGf, TGg, TGh, TGi and TGj may be turned on, and the write drivers WDRV[n], WDRVB[n], WDRV[m] and WDRVB[m] may be disabled. Thus, the top bitline BL[n], the top complementary bitline BLB[n], the bottom bitline BL[m] and the bottom complementary bitline BLB[m] may be electrically connected to the middle node, and leakage current may be recycled as illustrated by arrows "I2."

Referring to FIG. 10B, like that described with reference to FIG. 4B, an example where the write operation or the read operation is performed is illustrated. For example, an operation in the delay interval (e.g., the first time interval $t_{dw}$ in FIG. 6A and/or the first time interval $t_{dr}$ in FIG. 6B) is illustrated.

For example, the transmission gates TG1 and TG2 may be turned off, the transistors MN1 and MP1 may be turned on, and the wordline drivers WLDRV[n] and WLDRV[m] may be disabled. Thus, a current may be formed as illustrated by arrows "I3," the top ground voltage $CV_{SS}[n]$ may decrease, and the bottom power supply voltage $CV_{DD}[m]$ may increase.

In addition, during the write operation, the transmission gates TGa, TGb, TGf and TGg may be turned on, the transmission gates TGc, TGd, TGe, TGh, TGi and TGj may be turned off, and the write drivers WDRV[n], WDRVB[n], WDRV[m] and WDRVB[m] may be enabled. Thus, the top bitline BL[n] and the top complementary bitline BLB[n] may be pre-developed, and the bottom bitline BL[m] and the bottom complementary bitline BLB[m] may be pre-developed.

Further, during the read operation, the transmission gates TGa, TGb, TGc, TGd, TGe, TGf, TGg, TGh, TGi and TGj may be turned off, and the write drivers WDRV[n], WDRVB[n], WDRV[m] and WDRVB[m] may be disabled.

Referring to FIG. 10C, like that described with reference to FIG. 4B, an example where the write operation or the read operation is performed is illustrated. For example, an operation in the wordline enable interval (e.g., the second time interval $t_{wlw}$ in FIG. 6A and/or the second time interval $t_{wlr}$ in FIG. 6B) is illustrated.

For example, the transmission gates TG1 and TG2 and the transistors MN1 and MP1 may operate in the same manner as in FIG. 10B, and thus the top ground voltage $CV_{SS}[n]$ may continuously decrease and the bottom power supply voltage $CV_{DD}[m]$ may continuously increase. At the same time, the wordline drivers WLDRV[n] and WLDRV[m] may be enabled, and a current may be additionally formed as illustrated by arrows "I4." Thus, the top wordline WL[n] may be enabled such that a voltage at the top wordline WL[n] corresponds to a logic low level, and the bottom wordline WL[m] may be enabled such that a voltage at the bottom wordline WL[m] corresponds to a logic high level.

In addition, during the read operation, the transmission gates TGa, TGb, TGf and TGg may be turned on, the transmission gates TGc, TGd, TGe, TGh, TGi and TGj may be turned off, and the write drivers WDRV[n] and WDRVB[n], WDRV[m] and WDRVB[m] may be enabled. Thus, the top bitline BL[n] and the top complementary bitline BLB[n] may be developed, and the bottom bitline BL[m] and the bottom complementary bitline BLB[m] may be developed.

Further, during the write operation, the transmission gates TGa, TGb, TGc, TGd, TGe, TGf, TGg, TGh, TGi and TGj and the write drivers WDRV[n], WDRVB[n], WDRV[m] and WDRVB[m] may operate in the same manner as in FIG. 10B.

After the write operation or the read operation is performed, the top bitline BL[n], the top complementary bitline BLB[n], the bottom bitline BL[m] and the bottom complementary bitline BLB[m] may be precharged by the transmission gates TGa, TGb, TGc, TGd, TGe, TGf, TGg, TGh, TGi and TGj.

Figure 11:
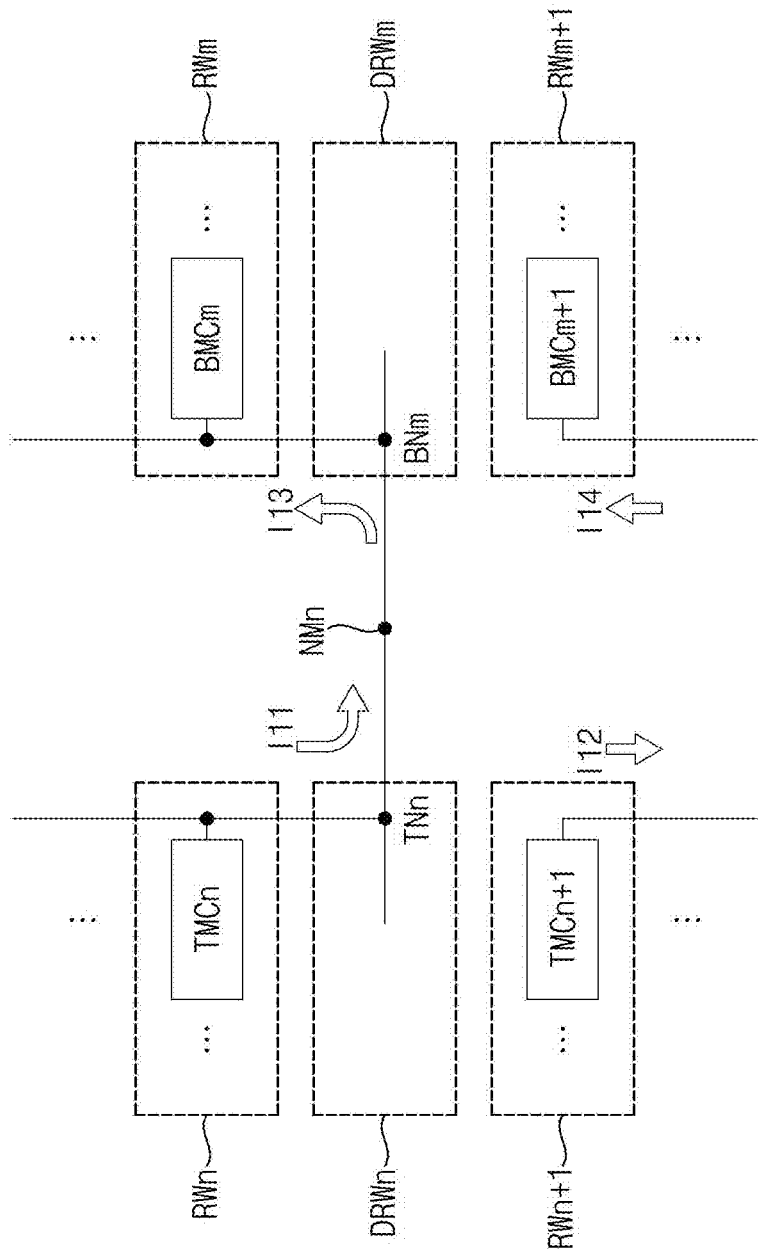
FIG. 11 is a block diagram illustrating an example of a memory cell array included in an SRAM of FIG. 9.

FIG. 11 is a block diagram illustrating an example of a memory cell array included in an SRAM of FIG. 9.

Referring to FIG. 11, a top memory cell array may include a top memory row RWn, a top dummy row DRWn and a top memory row RWn+1 that are sequentially arranged. A bottom memory cell array may include a bottom memory row RWm, a bottom dummy row DRWm and a bottom memory row RWm+1 that are sequentially arranged.

The top memory rows RWn and RWn+1 may include top memory cells TMCn and TMCn+1, and the top dummy row DRWn may include a top node TNn. The bottom memory rows RWm and RWm+1 may include bottom memory cells BMCm and BMCm+1, and the bottom dummy row DRWm may include a bottom node BNm.

In the standby state or the hold state, the top memory cell TMCn and the bottom memory cell BMCm may be connected to a middle node NMn through the top node TNn and the bottom node BNm, and currents I11 and I13 may be formed like the current I1 in FIG. 10A.

In addition, the top memory cell TMCn+1 and the bottom memory cell BMCn+1 may be connected to another middle node through nodes included in other dummy rows, and currents I12 and I14 may be formed like the current I1 in FIG. 10A.

Figure 12A:
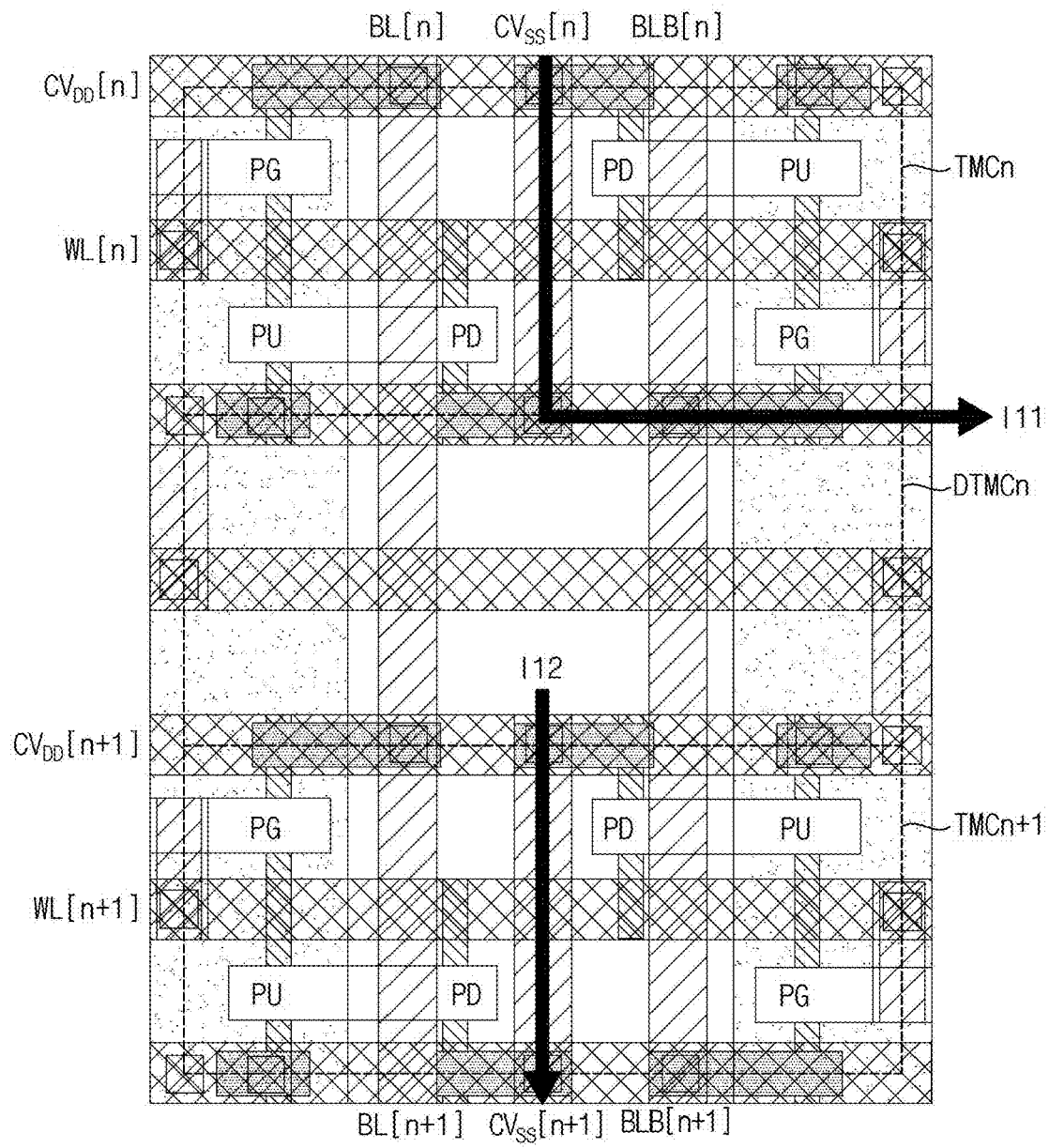

FIGS. 12A and 12B are plan views of an example layout of a memory cell array of FIG. 11. The descriptions repeated with FIGS. 5A and 5B will be omitted for brevity.

Referring to FIG. 12A, a layout of the top memory cells TMCn and TMCn+1 and the top dummy row DRWn in FIG. 11 is illustrated.

The top memory cell TMCn may be connected to the top wordline WL[n], the top bitline BL[n], the top complementary bitline BLB[n], a top power supply voltage $CV_{DD}[n]$ and the top ground voltage $CV_{SS}[n]$. The top memory cell TMCn+1 may be connected to a top wordline WL[n+1], a top bitline BL[n+1], a top complementary bitline BLB[n+1], a top power supply voltage $CV_{DD}[n+1]$ and a top ground voltage $CV_{SS}[n+1]$. A layout of each of the top memory cells TMCn and TMCn+1 may be substantially the same as that of the top memory cell 210 of FIG. 5A.

In the top dummy row DRWn, a region corresponding to the top memory cells TMCn and TMCn+1 may be referred to as a dummy memory cell DTMCn. A current path for the current I11 may be formed through the dummy memory cell DTMCn, and thus the dummy memory cell DTMCn may have a configuration for controlling the top ground voltage $CV_{SS}[n]$. A line of the top power supply voltage $CV_{SS}[n]$ of the top memory cell TMCn and a line of the top power supply voltage $CV_{SS}[n+1]$ of the top memory cell TMCn+1 may be electrically separated or isolated with respect to the dummy memory cell DTMCn.

Referring to FIG. 12B, a layout of the bottom memory cells BMCm and BMCm+1 and the bottom dummy row DRWm in FIG. 11 is illustrated.

The bottom memory cell BMCm may be connected to the bottom wordline WL[m], the bottom bitline BL[m], the bottom complementary bitline BLB[m], the bottom power supply voltage $CV_{DD}[m]$ and a bottom ground voltage $CV_{SS}[m]$. The bottom memory cell BMCm+1 may be connected to a bottom wordline WL[m+1], a bottom bitline BL[m+1], a bottom complementary bitline BLB[m+1], a bottom power supply voltage $CV_{DD}[m+1]$ and a bottom ground voltage $CV_{SS}[m+1]$. A layout of each of the bottom memory cells BMCm and BMCm+1 may be substantially the same as that of the bottom memory cell 220 of FIG. 5B.

In the bottom dummy row DRWm, a region corresponding to the bottom memory cells BMCm and BMCm+1 may be referred to as a dummy memory cell DBMCm. A current path for the current I13 may be formed through the dummy memory cell DBMCm, and thus the dummy memory cell DBMCm may have a configuration for controlling the bottom power supply voltage $CV_{DD}[m]$. A line of the bottom power supply voltage $CV_{DD}[m]$ of the bottom memory cell BMCm and a line of the bottom power supply voltage $CV_{DD}[m+1]$ of the bottom memory cell BMCm+1 may be electrically separated with respect to the dummy memory cell DBMCm.

In 14 nm process, $CVSS_{top}/CVDD_{bot}$ metals of top/bottom arrays may be composed of column-wise metal 1. If all $CVSS_{top}/CVDD_{bot}$ metals in the array are modified without changing the structure, a lot of power and time may be consumed. In the SRAM according to example embodiments, the $CVSS_{top}/CVDD_{bot}$ metals that are the column-wise metal 1 may be cut by inserting the dummy row, the cut $CVSS_{top}/CVDD_{bot}$ metals may be connected to row-wise metal 2, and thus the $CVSS_{top}/CVDD_{bot}$ metals may be efficiently modified.

FIGS. 13A, 13B, 14A, 14B, 14C, 14D and 14E are diagrams for describing performance of an SRAM according to example embodiments.

Figure 13A:
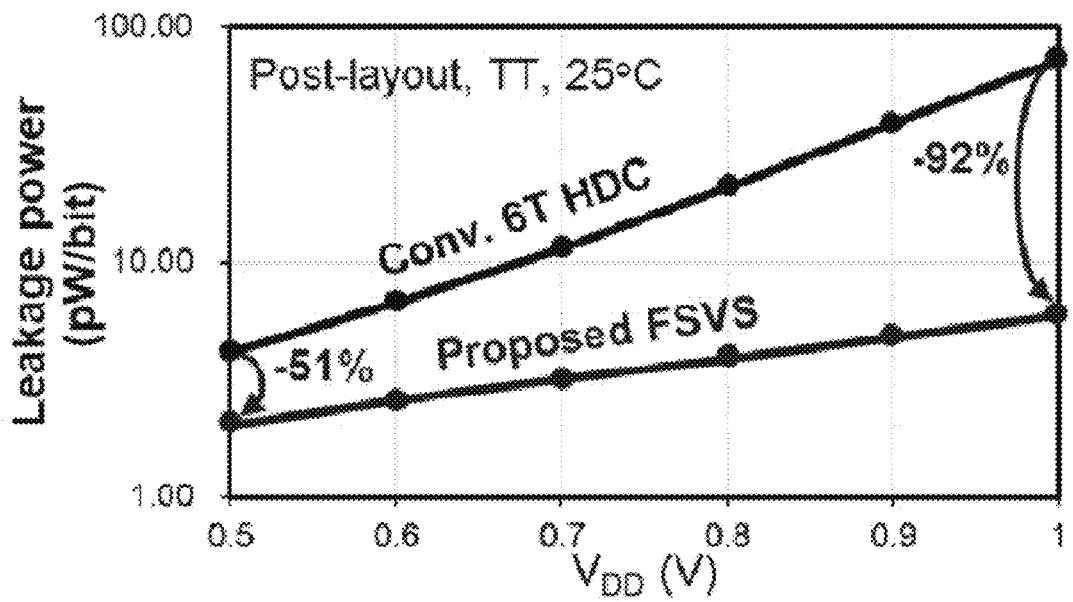
FIGS. 13A, 13B, 14A, 14B, 14C, 14D and 14E are diagrams for describing performance of an SRAM according to example embodiments.

Referring to FIG. 13A, it can be seen that leakage power is reduced in example embodiments as compared to a conventional art. The post-layout simulation was performed, "Conv. 6T HDC" represents leakage power in a conventional HDC, and "Proposed FSVS" represents leakage power in the FSVS structure according to example embodiments. It can be seen that the leakage power is reduced by about 92% when $V_{DD}$=1V, and the leakage power is reduced by about 51% when $V_{DD}$=0.5V.

Figure 13B:
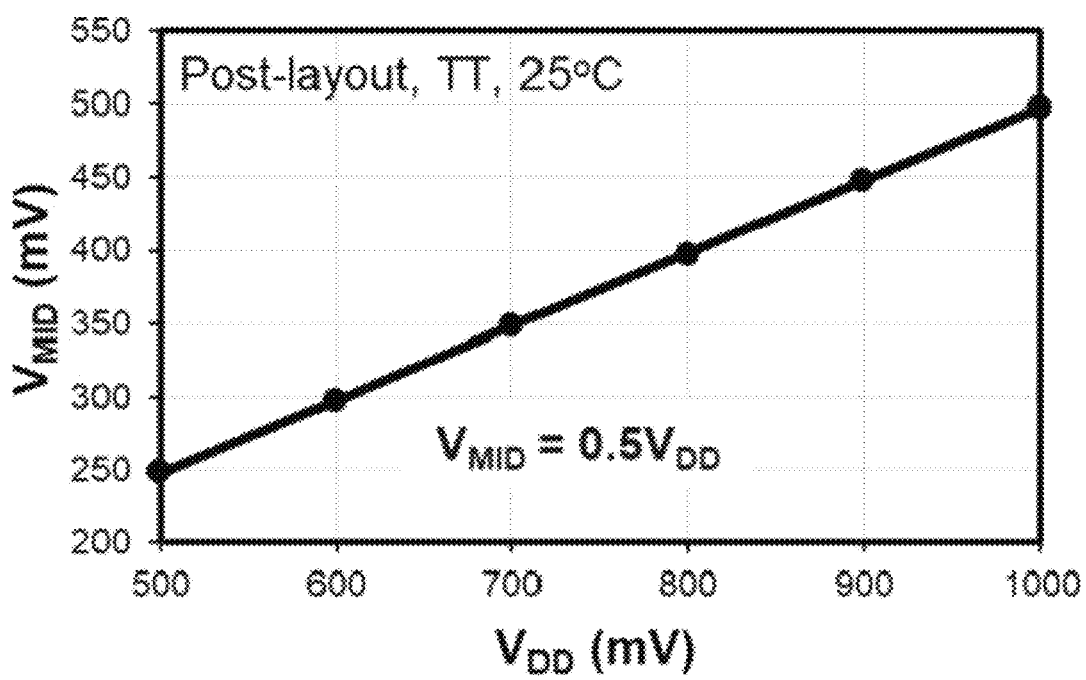

Referring to FIG. 13B, it can be seen that $V_{MID}$=0.5*$V_{DD}$ is stably maintained in example embodiments. The post-layout simulation was performed.

Referring to FIGS. 14A, 14B, 14C, 14D and 14E, it can be seen that read/write yields are improved in example embodiments as compared to a conventional art. In the FSVS structure according to example embodiments, $t_{delay}$, which is a length of the delay interval, may be adjusted, the wordline may be enabled before $CVSS_{top}/CVDD_{bot}$ become completely equal $V_{DD}/V_{SS}$, and thus the assist effect reducing the minimum operating voltage $V_{MIN}$ may be achieved. It can be seen that the assist effect is achieved by the read/write yield simulation results depending on $t_{delay}$.

Figure 14A:
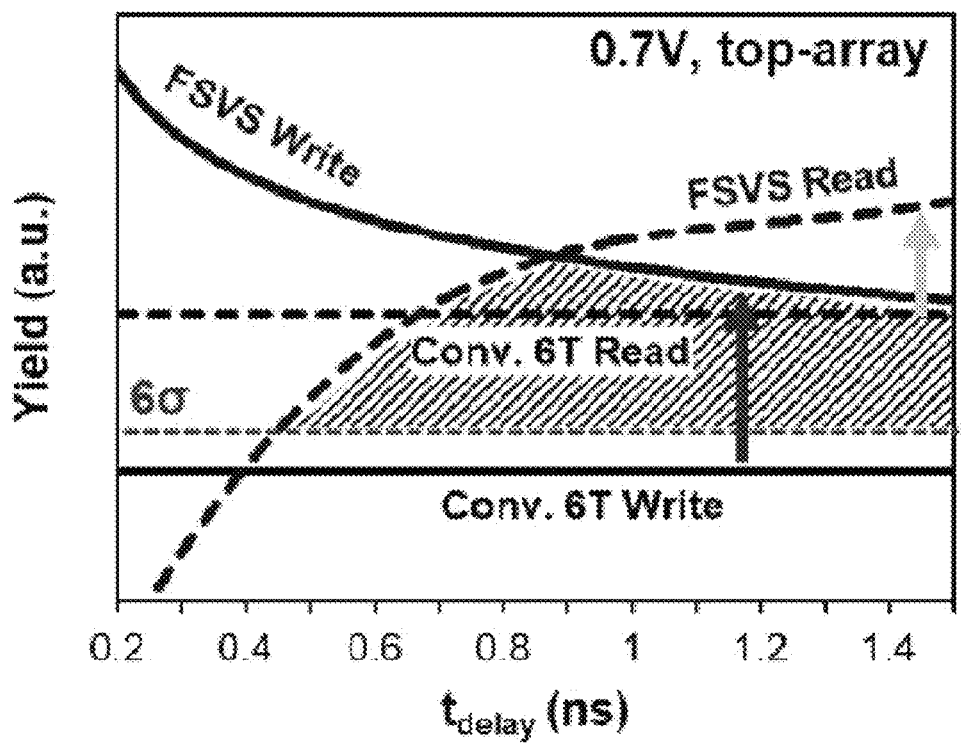
Figure 14B:
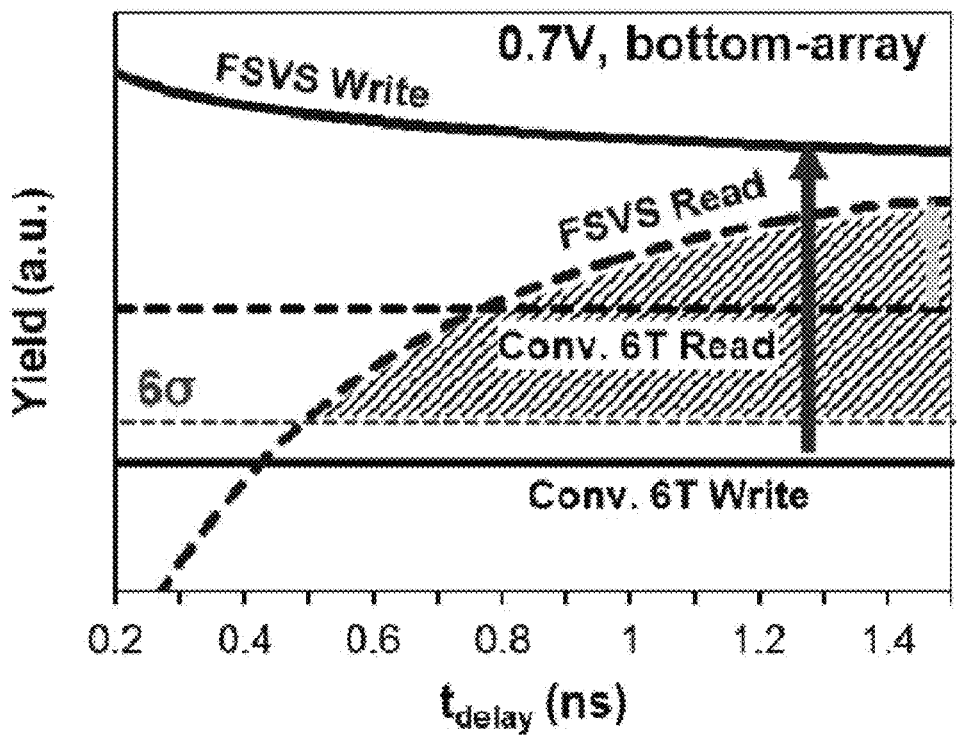
Figure 14C:
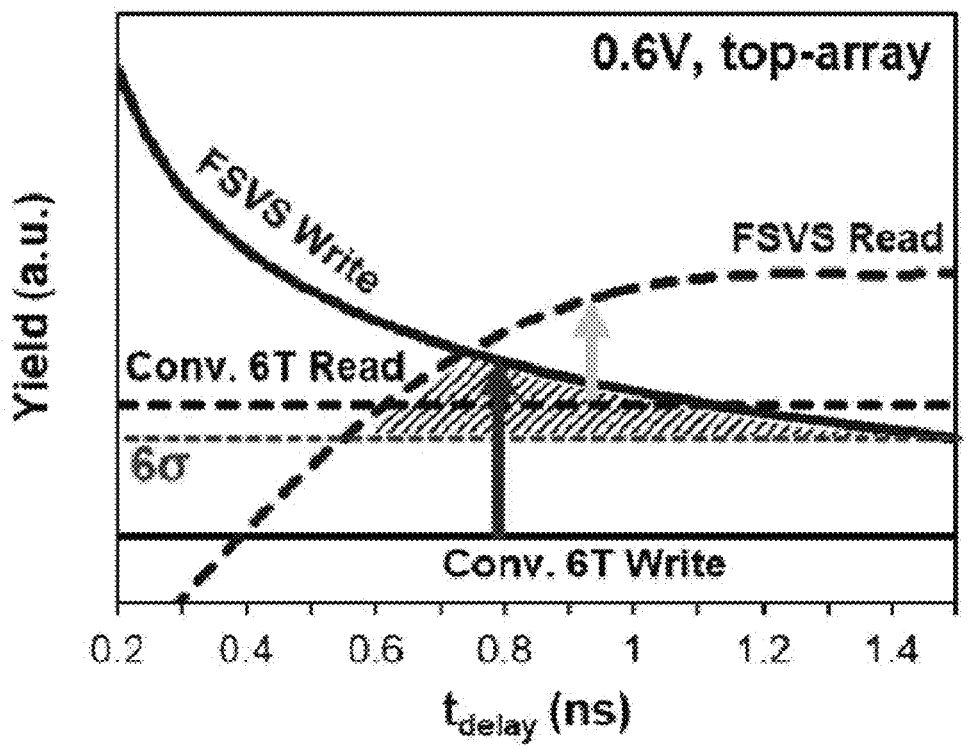
Figure 14D:
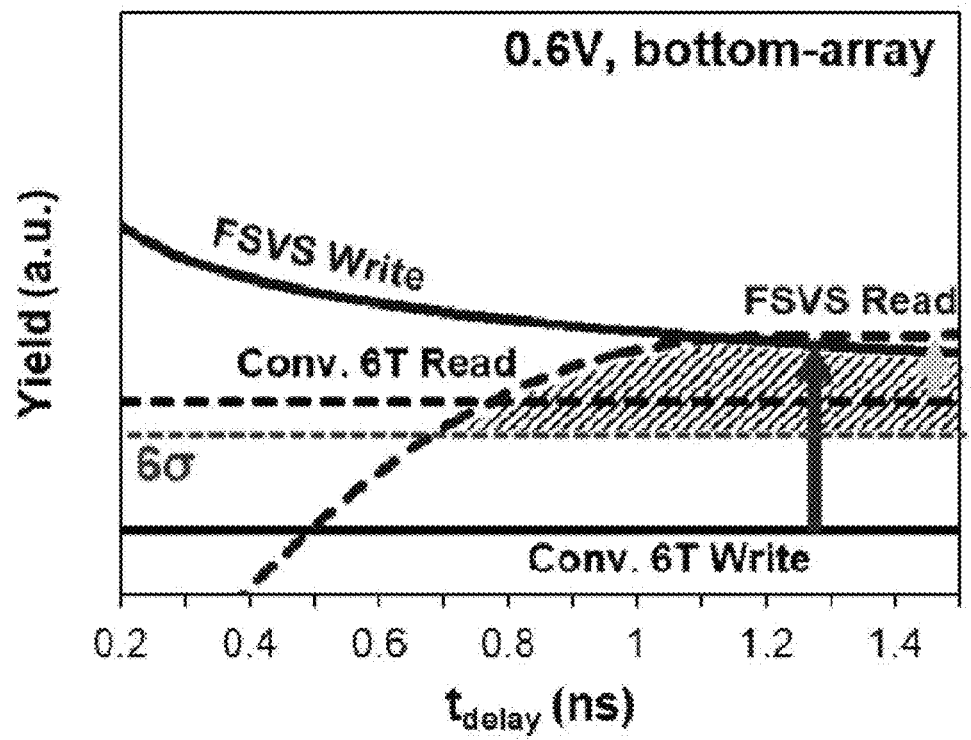
Figure 14E:
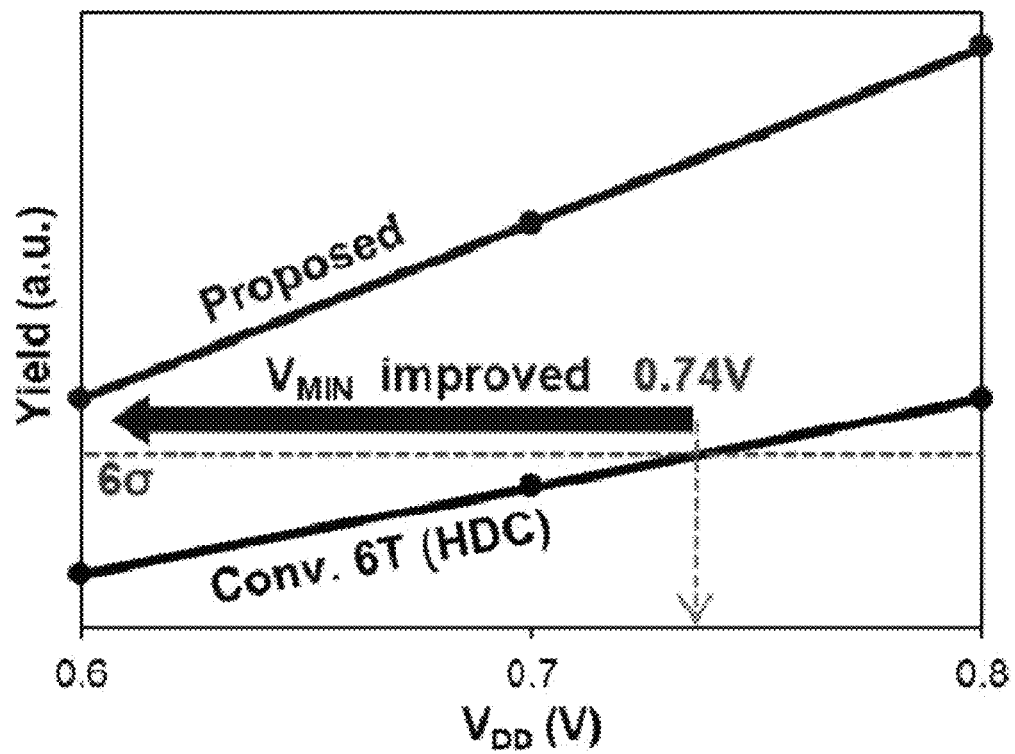

"Conv. 6T Write/Read" represent the write/read operations in the conventional HDC, and "FSVS Write/Read" represent the write/read operations in the FSVS structure according to example embodiments. In the conventional HDC, the minimum operating voltage satisfying the 6σ-yield was limited to about 0.74V due to low write-ability characteristics. In other words, when the operating voltage is about 0.7V or 0.6V, the conventional HDC may satisfy 6σ-yield during the read operation, but may not satisfy 6σ-yield during the write operation. In contrast, in the FSVS structure according to example embodiments, 6σ-yield may be satisfied by adjusting $t_{delay}$ even when the operating voltage is about 0.7V or 0.6V. In FIGS. 14A, 14B, 14C and 14D, hatched regions represent areas that satisfy 6σ-yield, dark thick arrows represent improvement in the write-ability by the lowered CVDD and the boosted CVSS, and light thick arrows represent improvement in the read-stability by the suppressed BL. Therefore, as illustrated in FIG. 14E, the minimum operating voltage $V_{MIN}$ may be reduced in the FSVS structure according to example embodiments, and thus low-power operation may be performed and power consumption may be reduced.

Figure 15:
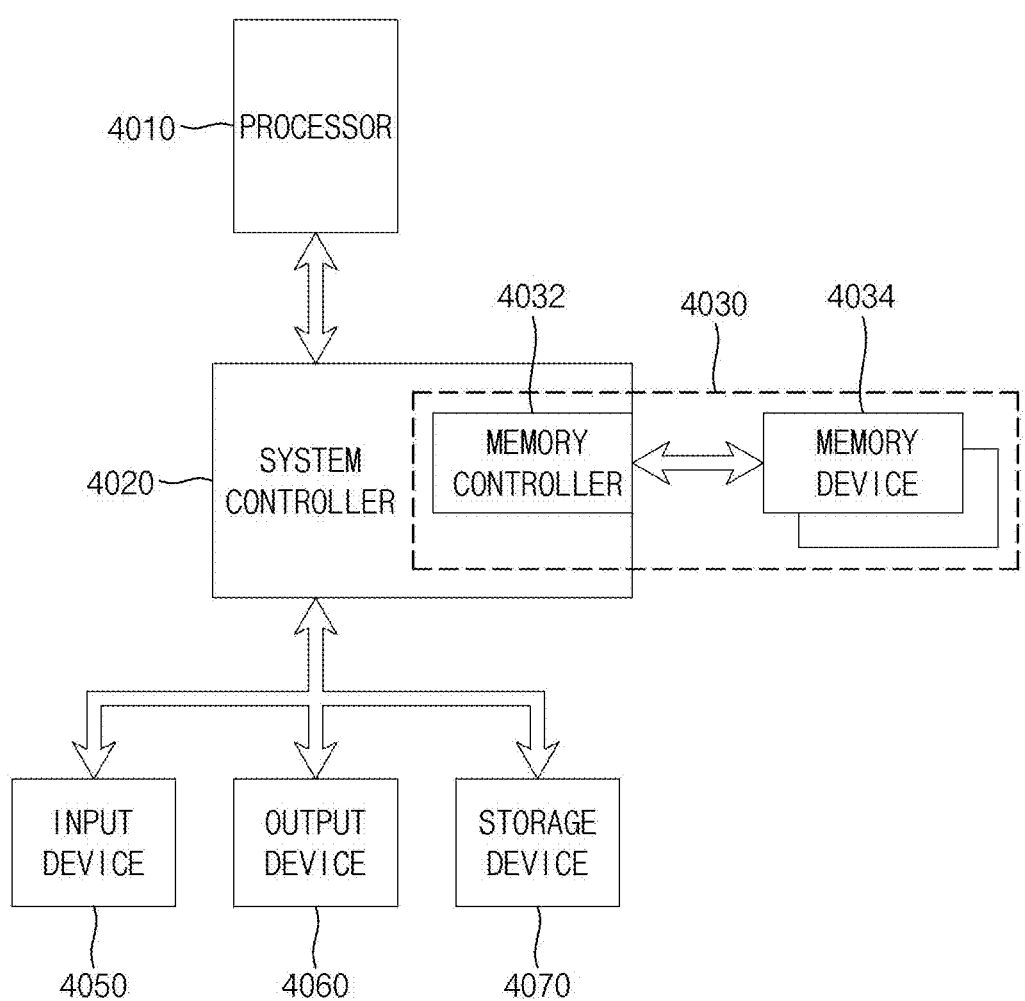
FIG. 15 is a block diagram illustrating a computing system according to example embodiments.

FIG. 15 is a block diagram illustrating a computing system according to example embodiments.

Referring to FIG. 15, a computing system 4000 includes a processor 4010, a system controller 4020 and a memory system 4030. The computing system 4000 may further include an input device 4050, an output device 4060 and a storage device 4070.

The memory system 4030 includes a plurality of memory devices 4034, and a memory controller 4032 for controlling the memory devices 4034. The memory controller 4032 may be included in the system controller 4020. Each of the plurality of memory devices 4034 may include the SRAM according to example embodiments.

The processor 4010 may perform various computing functions, such as executing specific software instructions for performing specific calculations or tasks. The processor 4010 may be connected to the system controller 4020 via a processor bus. The system controller 4020 may be connected to the input device 4050, the output device 4060 and the storage device 4070 via an expansion bus. As such, the processor 4010 may control the input device 4050, the output device 4060 and the storage device 4070 using the system controller 4020.

The example embodiments may be applied to various electronic devices and systems that include the SRAMs. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the teachings of the present disclosure. Accordingly, all such modifications are intended to be included within the scope of the present disclosure as set forth in the claims.

What is claimed is:

1. A memory cell array of a static random access memory (SRAM) comprising:
    a top memory cell array including a plurality of top memory cells; and
    a bottom memory cell array including a plurality of bottom memory cells,
    wherein the plurality of top memory cells include:
    a first top memory cell connected between a power supply voltage and a middle node, and connected to a first top wordline, a first top bitline and a first top complementary bitline,
    wherein the plurality of bottom memory cells include:
    a first bottom memory cell configured to operate with the first top memory cell, connected between the middle node and a ground voltage, and connected to a first bottom wordline, a first bottom bitline and a first bottom complementary bitline, and
    wherein, when a write operation and a read operation are not performed on the first top memory cell and the first bottom memory cell, the first top bitline, the first top complementary bitline, the first bottom bitline and the first bottom complementary bitline are electrically connected to the middle node, and
    wherein the first bottom memory cell is configured to be supplied with a power from the power supply voltage middle node.

2. The memory cell array of claim 1, wherein the first top memory cell includes:
    a first top p-type metal oxide semiconductor (PMOS) transistor and a first top n-type metal oxide semiconductor (NMOS) transistor connected in series between a first top power supply voltage and a first top ground voltage, each of the first top PMOS transistor and the first top NMOS transistor including a gate electrode connected to a first top node;
    a second top PMOS transistor and a second top NMOS transistor connected in series between the first top power supply voltage and the first top ground voltage, each of the second top PMOS transistor and the second top NMOS transistor including a gate electrode connected to a second top node;
    a third top PMOS transistor connected between the first top node and the first top bitline, and including a gate electrode connected to the first top wordline; and
    a fourth top PMOS transistor connected between the second top node and the first top complementary bitline, and including a gate electrode connected to the first top wordline.

3. The memory cell array of claim 2,
    wherein the first top power supply voltage is equal to the power supply voltage, and
    wherein, when the write operation and the read operation are not performed on the first top memory cell and the first bottom memory cell, the first top ground voltage is equal to a voltage at the middle node.

4. The memory cell array of claim 2, wherein the first bottom memory cell includes:
    a first bottom PMOS transistor and a first bottom NMOS transistor connected in series between a first bottom power supply voltage and a first bottom ground voltage, each of the first bottom PMOS transistor and the first bottom NMOS transistor including a gate electrode connected to a first bottom node;
    a second bottom PMOS transistor and a second bottom NMOS transistor connected in series between the first bottom power supply voltage and the bottom ground voltage, each of the second bottom PMOS transistor and the second bottom NMOS transistor including a gate electrode connected to a second bottom node;
    a third bottom NMOS transistor connected between the first bottom node and the first bottom bitline, and including a gate electrode connected to the first bottom wordline; and
    a fourth bottom NMOS transistor connected between the second bottom node and the first bottom complementary bitline, and including a gate electrode connected to the first bottom wordline.

5. The memory cell array of claim 4,
    wherein, when the write operation and the read operation are not performed on the first top memory cell and the first bottom memory cell, the first bottom power supply voltage is equal to a voltage at the middle node, and
    wherein the first bottom ground voltage is equal to the ground voltage.

6. The memory cell array of claim 1, wherein, when the write operation or the read operation is performed on the first top memory cell and the first bottom memory cell, the write operation or the read operation is performed on the first top memory cell and the first bottom memory cell.

7. The memory cell array of claim 6, wherein, when the write operation or the read operation is performed on the first top memory cell and the first bottom memory cell, in a first time interval before the first top wordline and the first bottom wordline are enabled, a first top ground voltage of the first top memory cell decreases, and a first bottom power supply voltage of the first bottom memory cell increases.

8. The memory cell array of claim 7, wherein, when the write operation or the read operation is performed on the first top memory cell and the first bottom memory cell, in the first time interval, the first top bitline and the first top complementary bitline are pre-developed, and the first bottom bitline and the first bottom complementary bitline are pre-developed.

9. The memory cell array of claim 7, wherein, when the write operation or the read operation is performed on the first top memory cell and the first bottom memory cell, in a second time interval after the first time interval, a voltage at the first top wordline corresponds to a logic low level, and a voltage at the first bottom wordline corresponds to a logic high level.

10. The memory cell array of claim 9, wherein, when the write operation or the read operation is performed on the first top memory cell and the first bottom memory cell, in the second time interval, the first top bitline and the first top complementary bitline are developed, and the first bottom bitline and the first bottom complementary bitline are developed.

11. The memory cell array of claim 1,
wherein the top memory cell array includes a plurality of top memory rows and at least one top dummy row,
wherein each of the plurality of top memory rows includes one or more of the plurality of top memory cells,
wherein the at least one top dummy row does not include the plurality of top memory cells, and
wherein a first top node for an electrical connection with the middle node is included in the at least one top dummy row.

12. The memory cell array of claim 11,
wherein the plurality of top memory rows include a first top memory row and a second top memory row,
wherein the plurality of top memory cells further include a second top memory cell,
wherein the first top memory cell is included in the first top memory row, and the second top memory cell is included in the second top memory row, and
wherein the first top node is shared by the first top memory cell and the second top memory cell.

13. The memory cell array of claim 1,
wherein the bottom memory cell array includes a plurality of bottom memory rows and at least one bottom dummy row,
wherein each of the plurality of bottom memory rows includes one or more of the plurality of bottom memory cells,
wherein the at least one bottom dummy row does not include the plurality of bottom memory cells, and
wherein a first bottom node for an electrical connection with the middle node is included in the at least one bottom dummy row.

14. The memory cell array of claim 13,
wherein the plurality of bottom memory rows include a first bottom memory row and a second bottom memory row,
wherein the plurality of bottom memory cells further include a second bottom memory cell,
wherein the first bottom memory cell is included in the first bottom memory row, and the second bottom memory cell is included in the second bottom memory row, and
wherein the first bottom node is shared by the first bottom memory cell and the second bottom memory cell.

15. A static random access memory (SRAM) comprising:
a memory cell array including a top memory cell array and a bottom memory cell array, the top memory cell array including a plurality of top memory cells, the bottom memory cell array including a plurality of bottom memory cells;
a row decoder connected to the memory cell array through a plurality of wordlines; and
a column decoder connected to the memory cell array through a plurality of bitlines,
wherein the plurality of top memory cells include:
a first top memory cell connected between a power supply voltage and a middle node, and connected to a first top wordline, a first top bitline and a first top complementary bitline,
wherein the plurality of bottom memory cells include:
a first bottom memory cell configured to operate with the first top memory cell, connected between the middle node and a ground voltage, and connected to a first bottom wordline, a first bottom bitline and a first bottom complementary bitline, and
wherein, when a write operation and a read operation are not performed on the first top memory cell and the first bottom memory cell, the first top bitline, the first top complementary bitline, the first bottom bitline and the first bottom complementary bitline are electrically connected to the middle node.

16. The SRAM of claim 15, wherein the row decoder includes:
a first wordline driver connected to the first top wordline;
a second wordline driver connected to the first bottom wordline; and
a middle node driver connected to the middle node.

17. The SRAM of claim 16, wherein the middle node driver includes:
a first transmission gate connected between a first top ground voltage of the first top memory cell and the middle node;
a second transmission gate connected between the middle node and a first bottom power supply voltage of the first bottom memory cell;
a first n-type metal oxide semiconductor (NMOS) transistor connected between the first top ground voltage and the ground voltage; and
a first p-type metal oxide semiconductor (PMOS) transistor connected between the power supply voltage and the first bottom power supply voltage.

18. The SRAM of claim 15, wherein the column decoder includes:
a first bitline driver connected to the first top bitline, the first top complementary bitline and the middle node; and
a second bitline driver connected to the first bottom bitline, the first bottom complementary bitline and the middle node.

19. The SRAM of claim 18, wherein the first bitline driver includes:
a first transmission gate connected between the first top bitline and a first global bitline;
a second transmission gate connected between the first top complementary bitline and a first global complementary bitline;
a first write driver connected to the first global bitline;
a second write driver connected to the first global complementary bitline;
a third transmission gate connected between the first global bitline and the first global complementary bitline;
a fourth transmission gate connected between the first global bitline and the middle node; and a fifth transmission gate connected between the first global complementary bitline and the middle node.

20. A memory cell array of a static random access memory (SRAM) comprising:
- a top memory cell array including a plurality of top memory cells; and
- a bottom memory cell array including a plurality of bottom memory cells,
- wherein the plurality of top memory cells include:
- a first top memory cell connected between a power supply voltage and a middle node, and connected to a first top wordline, a first top bitline and a first top complementary bitline, the first top memory cell having a 6T structure with six transistors, the six transistors of the first top memory cell including two p-type metal oxide semiconductor (PMOS) pass gate transistors,
- wherein the plurality of bottom memory cells include:
- a first bottom memory cell configured to operate with the first top memory cell, connected between the middle node and a ground voltage, and connected to a first bottom wordline, a first bottom bitline and a first bottom complementary bitline, the first bottom memory cell having a 6T structure with six transistors, the six transistors of the first bottom memory cell including two n-type metal oxide semiconductor (NMOS) pass gate transistors,
- wherein, when a write operation and a read operation are not performed on the first top memory cell and the first bottom memory cell, the first top bitline, the first top complementary bitline, the first bottom bitline and the first bottom complementary bitline are electrically connected to the middle node,
- wherein, when the write operation or the read operation is performed on the first top memory cell and the first bottom memory cell, the write operation or the read operation is performed on the first top memory cell and the first bottom memory cell,
- wherein, in a first time interval of the write operation or the read operation before the first top wordline and the first bottom wordline are enabled, a first top ground voltage of the first top memory cell decreases, and a first bottom power supply voltage of the first bottom memory cell increases, and
- wherein, in a second time interval of the write operation or the read operation after the first time interval, a voltage at the first top wordline corresponds to a logic low level, and a voltage at the first bottom wordline corresponds to a logic high level.

* * * * *